United States Patent
Kim et al.

(10) Patent No.: US 9,351,289 B2
(45) Date of Patent: May 24, 2016

(54) METHOD FOR TRANSMITTING UPLINK CONTROL INFORMATION AND USER EQUIPMENT, AND METHOD FOR RECEIVING UPLINK CONTROL INFORMATION AND BASE STATION

(75) Inventors: Hakseong Kim, Anyang-si (KR); Kijun Kim, Anyang-si (KR); Hanbyul Seo, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 159 days.

(21) Appl. No.: 14/124,644

(22) PCT Filed: Jun. 4, 2012

(86) PCT No.: PCT/KR2012/004389
§ 371 (c)(1),
(2), (4) Date: Dec. 6, 2013

(87) PCT Pub. No.: WO2012/169753
PCT Pub. Date: Dec. 13, 2012

(65) Prior Publication Data
US 2014/0098780 A1    Apr. 10, 2014

Related U.S. Application Data

(60) Provisional application No. 61/493,954, filed on Jun. 6, 2011.

(51) Int. Cl.
*H04W 72/04* (2009.01)
*H04J 11/00* (2006.01)
(Continued)

(52) U.S. Cl.
CPC ....... *H04W 72/0413* (2013.01); *H04J 11/0023* (2013.01); *H04L 1/1861* (2013.01); *H04L 5/0055* (2013.01); *H04W 72/0446* (2013.01)

(58) Field of Classification Search
CPC .......... H04W 72/0413; H04W 72/044; H04W 72/0446; H04W 72/00; H04W 72/04; H04W 72/12; H04W 72/1263; H04L 5/0055
USPC ........................................................ 370/329
See application file for complete search history.

(56) References Cited

U.S. PATENT DOCUMENTS 8,630,240 B2 *   1/2014   Shen et al. ................... 370/329
9,148,880 B2 *   9/2015   Ko et al.
(Continued)

OTHER PUBLICATIONS

Motorola, "CCE Scrambling for Reliable PDCCH Location Detection," 3GPP TSG RAN1 #51bis, R1-080568 (R1-080094), Jan. 2008, 2 pages.

(Continued)

*Primary Examiner* — Warner Wong
(74) *Attorney, Agent, or Firm* — Lee Hong Degerman Kang & Waimey; Jonathan Kang; Jeffrey Lotspeich

(57) ABSTRACT

The present invention provides a method and apparatus for uplink transmission/reception of at least one slot in a subframe comprising two slots. A base station transmits information which controls the slot performing the uplink transmission among the two slots, to user equipment, and the user equipment performs uplink transmission from the slot directed by the information. When the user equipment transmits ACK/NACK information, the ACK/NACK information is transmitted from the first slot of the user equipment if the CCE associated with the first slot is the CCE included in the PDCCH of the user equipment, and the ACK/NACK information is transmitted from the second slot if the CCE is the CCE associated with the second slot.

20 Claims, 20 Drawing Sheets

(51) Int. Cl.
*H04L 1/18* (2006.01)
*H04L 5/00* (2006.01)

(56) References Cited

U.S. PATENT DOCUMENTS

| | | | |
|---|---|---|---|
| 2010/0272048 A1* | 10/2010 | Pan et al. | 370/329 |
| 2011/0243066 A1* | 10/2011 | Nayeb Nazar et al. | 370/328 |
| 2011/0249634 A1* | 10/2011 | Lee et al. | 370/329 |
| 2012/0039285 A1* | 2/2012 | Seo et al. | 370/329 |
| 2012/0044871 A1* | 2/2012 | Li et al. | 370/328 |
| 2012/0288025 A1* | 11/2012 | Ogawa et al. | 375/267 |
| 2013/0170462 A1* | 7/2013 | Seo et al. | 370/329 |
| 2014/0016596 A1* | 1/2014 | Kim et al. | 370/329 |
| 2014/0092832 A1* | 4/2014 | Han et al. | 370/329 |
| 2015/0092723 A1* | 4/2015 | Ahn et al. | 370/329 |

OTHER PUBLICATIONS

LG Electronics, "CCE to bundled ACK/NACK index mapping in TDD," 3GPP TSG RAN WG1 #53, R1-081816, May 2008, 6 pages.
NEC Group, "Detail on mapping between ACK/NACK index and CCE index," 3GPP TSG RAN WG1 Meeting #52, R1-081020, Feb. 2008, 4 pages.
PCT International Application No. PCT/KR2012/004389, Written Opinion of the International Searching Authority dated Dec. 12, 2012, 16 pages.

* cited by examiner

Structure of PUCCH formats 1a and 1b (Normal CP case)

Structure of PUCCH formats 1a and 1b (Extended CP case)

Structure of PUCCH formats 2, 2a, and 2b (Normal CP case)

Structure of PUCCH formats 2, 2a, and 2b (Extended CP case)

METHOD FOR TRANSMITTING UPLINK CONTROL INFORMATION AND USER EQUIPMENT, AND METHOD FOR RECEIVING UPLINK CONTROL INFORMATION AND BASE STATION

CROSS-REFERENCE TO RELATED APPLICATIONS

This application is the National Stage filing under 35 U.S.C. 371 of International Application No. PCT/KR2012/004389, filed on Jun. 4, 2012, which claims the benefit on U.S. Provisional Application Ser. No. 61/493,954, filed on Jun. 6, 2011, the contents of which are all hereby incorporated by reference herein in their entirety.

TECHNICAL FIELD

The present invention relates to a wireless communication system. Specifically, the present invention relates to a method and apparatus for transmitting an uplink signal and a method and apparatus for receiving an uplink signal.

BACKGROUND ART

With appearance and spread of machine-to-machine (M2M) communication and a variety of devices such as smart-phones and tablet PCs demanding a large amount of data transmission, data throughput needed in a cellular network has rapidly increased. To satisfy such rapidly increasing data throughput, carrier aggregation technology, cognitive radio technology, etc. for efficiently employing more frequency bands and multiple input multiple output (MIMO) technology, multi-base station (BS) cooperation technology, etc. for raising data capacity transmitted on limited frequency resources have been developed. In addition, a communication environment has evolved into increasing density of nodes accessible by a user at the periphery of the nodes. A communication system including high-density nodes may provide a better communication service to the user by cooperation between the nodes.

DETAILED DESCRIPTION OF THE INVENTION

Technical Problems

Due to introduction of new radio communication technology, the number of user equipments (UEs) to which a BS should provide a service in a prescribed resource region increases and the amount of uplink data and uplink control information that the BS should receive from the UEs increases. Since the amount of resources available to the BS for communication with the UE(s) is finite, a new method in which the BS efficiently receives uplink data and/or uplink control information using the finite radio resources is needed.

Accordingly, the present invention provides a method and apparatus for efficiently transmitting/receiving an uplink signal.

The technical objects that can be achieved through the present invention are not limited to what has been particularly described hereinabove and other technical objects not described herein will be more clearly understood by persons skilled in the art from the following detailed description.

Technical Solutions

According to an aspect of the present invention, provided herein is a method for transmitting uplink control information by a user equipment in a wireless communication system, including receiving a physical downlink control channel (PDCCH) from a base station; and transmitting a physical uplink control channel (PUCCH) carrying acknowledgement/negative acknowledgement (ACK/NACK) information corresponding to the PDCCH to the base station, wherein the PUCCH is transmitted in a first slot of a subframe when an index of a first control channel element (CCE) included in the PDCCH belongs to a first CCE set and the PUCCH is transmitted in a second slot of the subframe when the index of the first CCE belongs to a second CCE set.

In another aspect of the present invention, provided herein is a user equipment for transmitting uplink control information in a wireless communication system, including a radio frequency (RF) unit configured to transmit or receive a radio signal; and a processor configured to control the RF unit to receive a physical downlink control channel (PDCCH) from a base station and transmit a physical uplink control channel (PUCCH) carrying acknowledgement/negative acknowledgement (ACK/NACK) information corresponding to the PDCCH to the base station, wherein the processor controls the RF unit to transmit the PUCCH in a first slot of a subframe when an index of a first control channel element (CCE) included in the PDCCH belongs to a first CCE set and the processor controls the RF unit to transmit the PUCCH in a second slot of the subframe when the index of the first CCE belongs to a second CCE set.

In another aspect of the present invention, provided herein is a method for receiving uplink control information by a base station in a wireless communication system, including transmitting a physical downlink control channel (PDCCH) to a user equipment; and receiving a physical uplink control channel (PUCCH) carrying acknowledgement/negative acknowledgement (ACK/NACK) information corresponding to the PDCCH from the user equipment, wherein the PUCCH is received in a first slot of a subframe when an index of a first control channel element (CCE) included in the PDCCH belongs to a first CCE set and the PUCCH is received in a second slot of the subframe when the index of the first CCE belongs to a second CCE set.

In another aspect of the present invention, provided herein is a base station for receiving uplink control information in a wireless communication system, including a radio frequency (RF) unit configured to transmit or receive a radio signal; and a processor configured to control the RF unit to transmit a physical downlink control channel (PDCCH) to a user equipment and receive a physical uplink control channel (PUCCH) carrying acknowledgement/negative acknowledgement (ACK/NACK) information corresponding to the PDCCH from the user equipment, wherein the processor controls the RF unit to receive the PUCCH in a first slot of a subframe when an index of a first control channel element (CCE) included in the PDCCH belongs to a first CCE set and the processor controls the RF unit to receive the PUCCH in a second slot of the subframe when the index of the first CCE belongs to a second CCE set.

In each aspect of the present invention, any one of the first CCE set and the second CCE set may include CCE indexes 0 to M−1 (where M is a positive integer) among a total of N CCE indexes (where N is an integer greater than 2) and the other one may include CCE indexes M to N−1 among the N CCE indexes.

In each aspect of the present invention, information indicating M may be transmitted to the user equipment from the base station.

In each aspect of the present invention, any one of the first CCE set and the second CCE set may include only even-numbered indexes among a total of N CCE indexes (where N is an integer greater than 2) and the other one may include only odd-numbered indexes.

The above technical solutions are merely some parts of the embodiments of the present invention and various embodiments into which the technical features of the present invention are incorporated can be derived and understood by persons skilled in the art from the following detailed description of the present invention.

Advantageous Effects

According to the present invention, efficiency of uplink resource use is enhanced.

In addition, according to the present invention, since the number of uplink transmissions multiplexed on predetermined time-frequency resources is reduced, interference occurring between uplink transmissions on the predetermined time-frequency resources decreases.

Effects according to the present invention are not limited to what has been particularly described hereinabove and other advantages not described herein will be more clearly understood by persons skilled in the art from the following detailed description of the present invention.

DESCRIPTION OF DRAWINGS

The accompanying drawings, which are included to provide a further understanding of the invention, illustrate embodiments of the invention and together with the description serve to explain the principle of the invention.

BEST MODE FOR CARRYING OUT THE INVENTION

Figure 1:
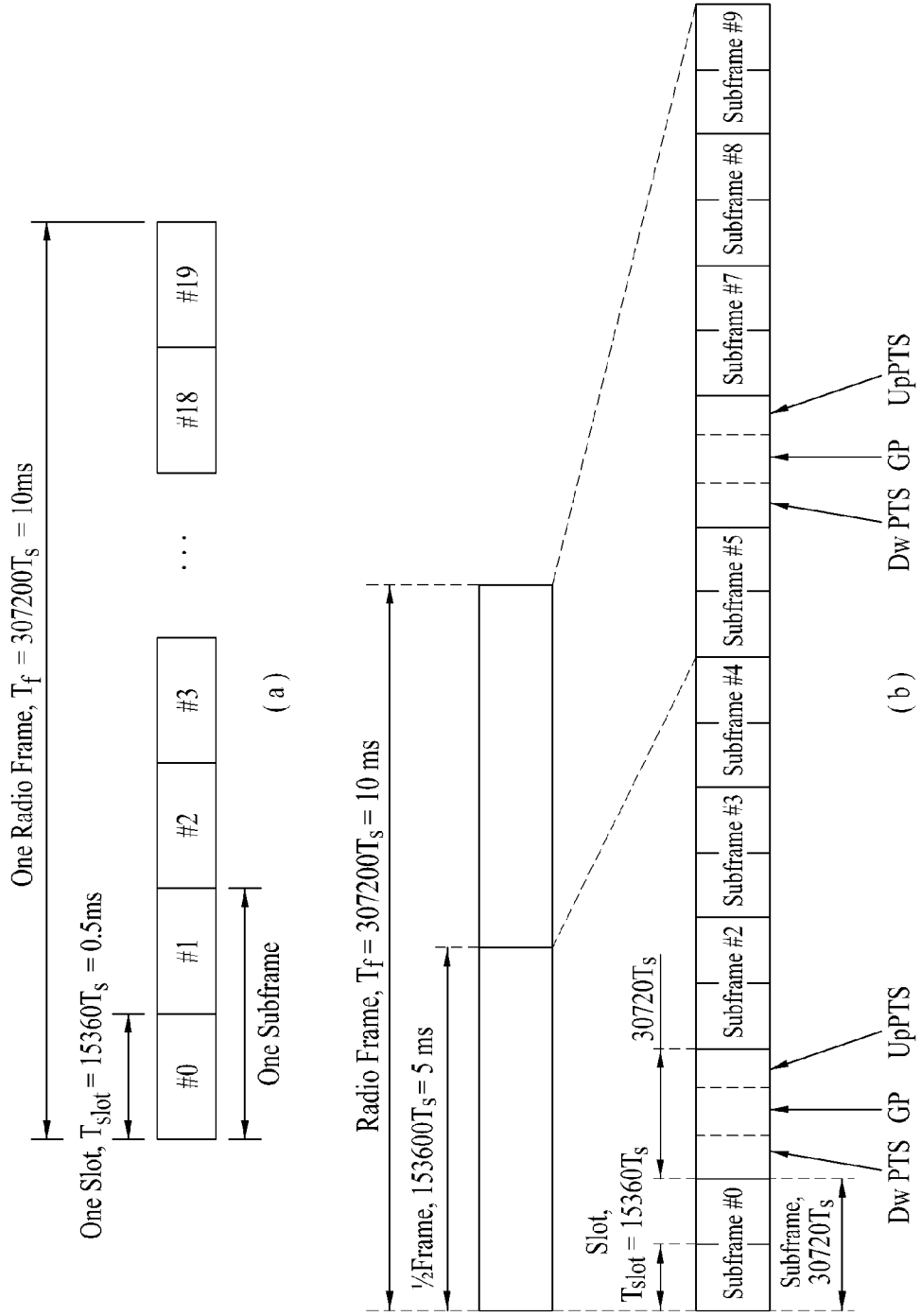
FIG. 1 illustrates the structure of a radio frame used in a wireless communication system.

Reference will now be made in detail to the exemplary embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

Further, a technique, a device, and a system, which will be described hereinbelow, may be applied to various multiple access radio systems. For convenience, description will be given under the assumption that the present invention is applied to 3GPP LTE(-A). However, technical features of the present invention are not limited thereto. For example, although the following detailed description is given based on a 3GPP LTE(-A) mobile communication system, the present invention is applicable to other mobile communication systems except for matters that are specific to 3GPP LTE(-A).

In some instances, known structures and devices are omitted or are shown in block diagram form, focusing on important features of the structures and devices, so as not to obscure the concept of the present invention. The same reference numbers will be used throughout this specification to refer to the same or like parts.

In the present invention, a user equipment (UE) denotes a fixed or mobile type terminal Examples of the UE include various devices that transmit and receive user data and/or various kinds of control information to and from a base station. The UE may be referred to as a terminal equipment (TE), a mobile station (MS), a mobile terminal (MT), a user terminal (UT), a subscriber station (SS), a wireless device, a personal digital assistant (PDA), a wireless modem, or a handheld device. In addition, in the present invention, a base station (BS) means a fixed station that performs communication with a UE and/or another BS, and exchanges various kinds of data and control information with the UE and another BS. The BS may be referred to as an advanced base station (ABS), a node-B (NB), an evolved node-B (eNB), a base transceiver system (BTS), an access point (AP), or a processing server (PS).

In the present invention, a physical downlink control channel (PDCCH), a physical control format indicator channel (PCFICH), a physical hybrid automatic retransmit request indicator channel (PHICH), and a physical downlink shared channel (PDSCH) refer to a set of time-frequency resources or Resource Elements (REs) carrying downlink control information (DCI), a set of time-frequency resources or REs carrying a control format indicator (CFI), a set of time-frequency resources or REs carrying downlink acknowledgement (ACK)/negative ACK (NACK), and a set of time-frequency resources or REs carrying downlink data, respectively. In addition, a physical uplink control channel (PUCCH) and a physical uplink shared channel (PUSCH) refer to a set of time-frequency resources or REs carrying uplink control information (UCI) and a set of time-frequency resources or REs uplink data, respectively. In the present invention, in particular, a time-frequency resource or RE that is assigned to or belongs to PDCCH/PCFICH/PHICH/PDSCH/PUCCH/PUSCH is referred to as PDCCH/PCFICH/PHICH/PDSCH/PUCCH/PUSCH RE or PDCCH/PCFICH/PHICH/PDSCH/PUCCH/PUSCH time-frequency resource, respectively. Therefore, in the present invention, PUCCH/PUSCH transmission of a UE is conceptually identical to UCI/uplink data/random access signal transmission on PUSCH/PUCCH, respectively. In addition, PDCCH/PCFICH/PHICH/PDSCH transmission of a BS is conceptually identical to downlink data/DCI transmission on PDCCH/PCFICH/PHICH/PDSCH, respectively.

Also, in the present invention, Cell-specific Reference Signal (CRS)/Demodulation Reference Signal (DMRS)/Channel State Information Reference Signal (CSI-RS) time-frequency resources (or REs) respectively mean REs that may be allocated or used for CRS/DMRS/CSI-RS, or time-frequency resources (or REs) carrying CRS/DMRS/CSI-RS. Also, subcarriers that include CRS/DMRS/CSI-RS RE may be referred to as CRS/DMRS/CSI-RS subcarriers, and OFDM symbols that include CRS/DMRS/CSI-RS RE may be referred to as CRS/DMRS/CSI-RS symbols. In addition, sounding reference signal (SRS) time-frequency resources (REs) refer to time-frequency resources (REs) carrying an SRS that is transmitted from a UE to a BS and is used by the BS for measurement of an uplink channel state formed between the UE and the BS. A reference signal (RS) refers to a predefined particular waveform of signal, known to the UE and the BS and is also referred to as a pilot.

FIG. 1 illustrates the structure of a radio frame used in a wireless communication system. Specifically, FIG. 1(a) illustrates an exemplary structure of a radio frame which can be used in frequency division duplex (FDD) in 3GPP LTE(-A) and FIG. 1(b) illustrates an exemplary structure of a radio frame which can be used in time division duplex (TDD) in 3GPP LTE(-A).

Referring to FIG. 1, a 3GPP LTE(-A) radio frame is 10 ms (307,200$T_s$) in duration. The radio frame is divided into 10 subframes of equal size. Subframe numbers may be assigned to the 10 subframes within one radio frame, respectively. Here, $T_s$ denotes sampling time where $T_s=1/(2048*15$ kHz$)$. Each subframe is 1 ms long and further divided into two slots. 20 slots are sequentially numbered from 0 to 19 in one radio frame. Duration of each slot is 0.5 ms. A time interval in which one subframe is transmitted is defined as a transmission time interval (TTI). Time resources may be distinguished by a radio frame number (or radio frame index), a subframe number (or subframe index), a slot number (or slot index), and the like.

A radio frame may have different configurations according to duplex modes. In FDD mode for example, since downlink (DL) transmission and uplink (UL) transmission are discriminated according to frequency, a radio frame for a specific frequency band operating on a carrier frequency includes either DL subframes or UL subframes. In TDD mode, since DL transmission and UL transmission are discriminated according to time, a radio frame for a specific frequency band operating on a carrier frequency includes both DL subframes and UL subframes.

Table 1 shows an exemplary UL-DL configuration within a radio frame in TDD mode.

TABLE 1

| DL-UL configuration | Downlink-to-Uplink switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In Table 1, D denotes a DL subframe, U denotes a UL subframe, and S denotes a special subframe. The special subframe includes three fields, i.e. downlink pilot time slot (DwPTS), guard period (GP), and uplink pilot time slot (UpPTS). DwPTS is a time slot reserved for DL transmission and UpPTS is a time slot reserved for UL transmission.

Figure 2:
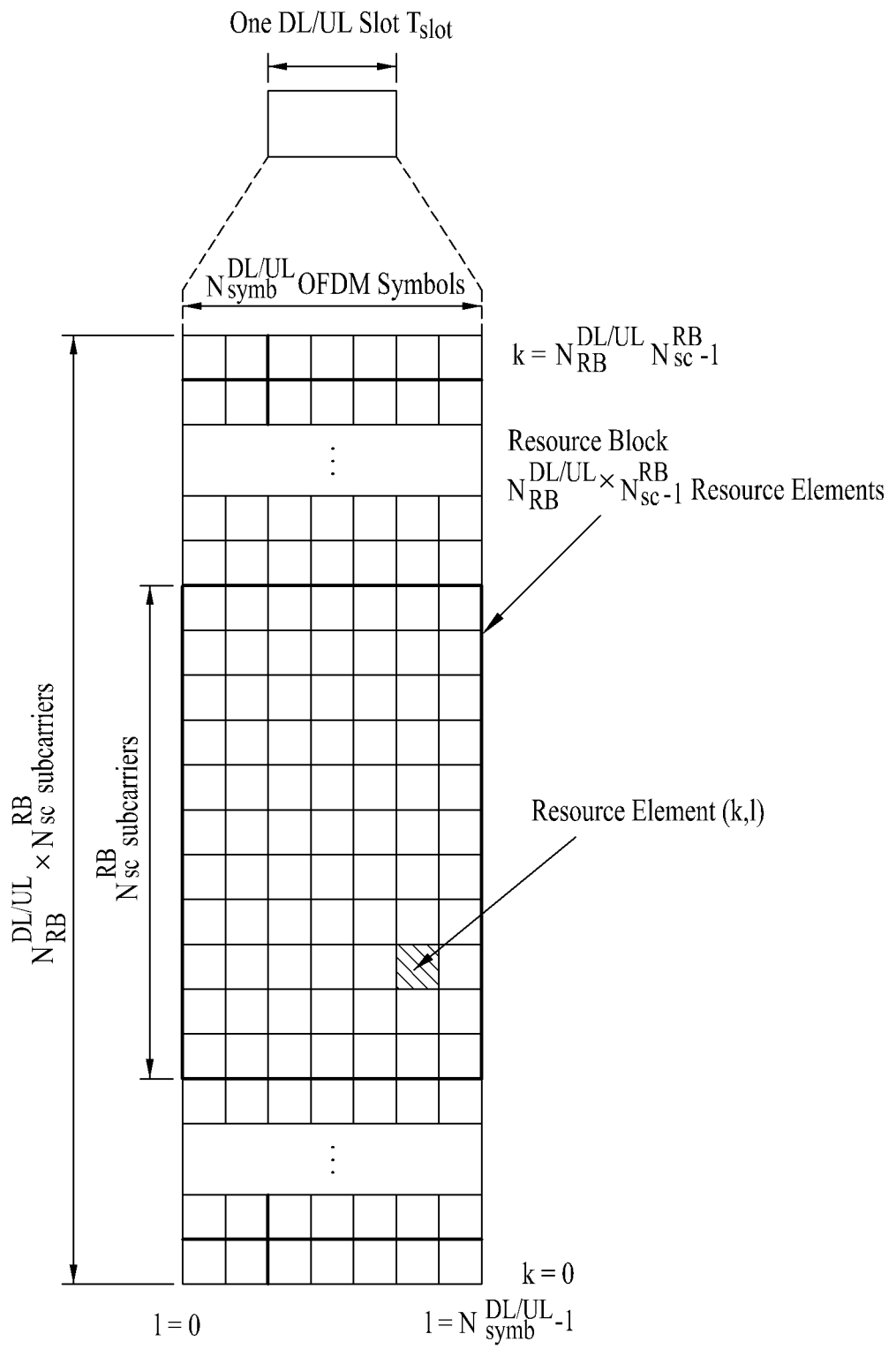
FIG. 2 illustrates the structure of a downlink (DL)/uplink (UL) slot in a wireless communication system.

FIG. 2 illustrates the structure of a DL/UL slot structure in a wireless communication system. In particular, FIG. 2 illustrates the structure of a resource grid of a 3GPP LTE(-A) system. One resource grid exists per antenna port.

A slot includes a plurality of orthogonal frequency division multiplexing (OFDM) symbols in the time domain and includes a plurality of resource blocks (RBs) in the frequency domain. The OFDM symbol may refer to one symbol duration. Referring to FIG. 2, a signal transmitted in each slot may be expressed by a resource grid including $N^{DL/UL}_{RB}*N^{RB}_{sc}$ subcarriers and $N^{DL/UL}_{symb}$ OFDM symbols. $N^{DL}_{RB}$ denotes the number of resource blocks (RBs) in a DL slot and $N^{UL}_{RB}$ denotes the number of RBs in a UL slot. $N^{DL}_{RB}$ and $N^{UL}_{RB}$ depend on a DL transmission bandwidth and a UL transmission bandwidth, respectively. $N^{DL}_{symb}$ denotes the number of OFDM symbols in a DL slot, $N^{UL}_{symb}$ denotes the number of OFDM symbols in a UL slot, and $N^{RB}_{sc}$ denotes the number of subcarriers configuring one RB.

An OFDM symbol may be referred to as an OFDM symbol, an SC-FDM symbol, etc. according to multiple access schemes. The number of OFDM symbols included in one slot may be varied according to channel bandwidths and CP lengths. For example, in a normal cyclic prefix (CP) case, one slot includes 7 OFDM symbols. In an extended CP case, one slot includes 6 OFDM symbols. Although one slot of a subframe including 7 OFDM symbols is shown in FIG. 2 for convenience of description, embodiments of the present invention are similarly applicable to subframes having a different number of OFDM symbols. Referring to FIG. 2, each OFDM symbol includes $N^{DL/UL}_{RB}*N^{RB}_{sc}$ subcarriers in the frequency domain. The type of the subcarrier may be divided into a data subcarrier for data transmission, a reference signal (RS) subcarrier for RS transmission, and a null subcarrier for a guard band and a DC component. The null subcarrier for the DC component is unused and is mapped to a carrier frequency $f_0$ in a process of generating an OFDM signal or in a frequency up-conversion process. The carrier frequency is also called a center frequency.

One RB is defined as $N^{DL/UL}_{symb}$ (e.g. 7) consecutive OFDM symbols in the time domain and as $N^{RB}_{sc}$ (e.g. 12) consecutive subcarriers in the frequency domain. For reference, a resource composed of one OFDM symbol and one subcarrier is referred to as a resource element (RE) or tone. Accordingly, one RB includes $N^{DL/UL}_{symb}*N^{RB}_{sc}$ REs. Each RE within a resource grid may be uniquely defined by an index pair (k, l) within one slot. k is an index ranging from 0 to $N^{DL/UL}_{RB}*N^{RB}_{sc}-1$ in the frequency domain, and l is an index ranging from 0 to $N^{DL/UL}_{symb}-1$ in the time domain.

In one subframe, two RBs each located in two slots of the subframe while occupying the same $N^{RB}_{sc}$ consecutive sub-carriers are referred to as a physical resource block (PRB) pair. Two RBs configuring a PRB pair have the same PRB number (or the same PRB index). A virtual resource block (VRB) is a logical resource allocation unit for resource allocation. The VRB has the same size as that of the PRB. A VRB may be classified into a localized VRB or a distributed VRB depending on a mapping mode of VRB into PRB. Localized VRBs are mapped directly to PRBs such that VRB number (VRB index) corresponds to PRB number. That is, $n_{PRB}=n_{VRB}$ is obtained. Localized VRBs are numbered from 0 to $N^{DL}_{VRB}-1$, where $N^{DL}_{VRB}=N^{DL}_{RB}$. Accordingly, according to the localized mapping mode, VRBs having the same VRB number are mapped into PRBs having the same PRB number at the first slot and the second slot. On the other hand, distributed VRBs are mapped to PRBs via interleaving. Accordingly, VRBs having the same VRB number may be mapped into the PRBs having different PRB numbers at the first slot and the second slot. Two PRBs, which are respectively located at two slots of the subframe and have the same VRB number, will be referred to as VRB pair.

Figure 3:
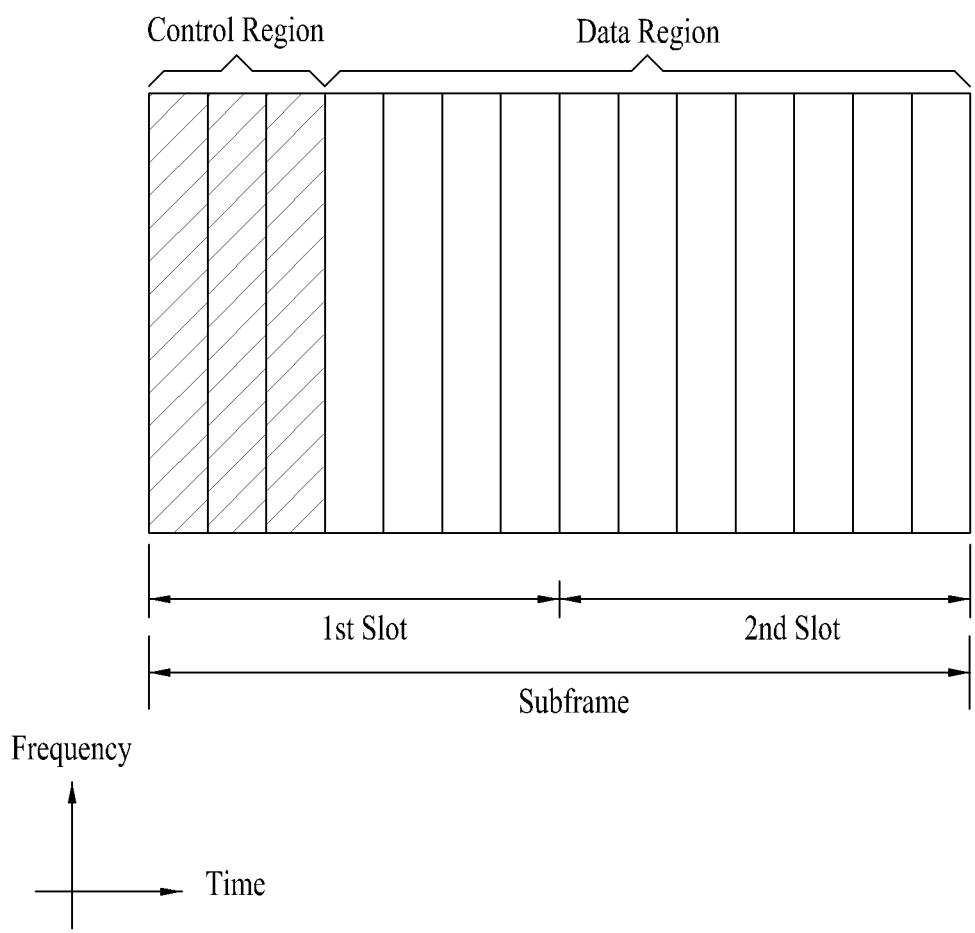
FIG. 3 illustrates the structure of a DL subframe used in a 3GPP LTE(-A) system.

FIG. 3 is a diagram illustrating a structure of a downlink frame used in a 3GPP LTE(-A) system.

The downlink subframe is divided into a control region and a data region in a time domain. Referring to FIG. 3, maximum three (or four) OFDM symbols located at the front of the first slot of the subframe correspond to the control region to which a control channel is allocated. Hereinafter, a resource region available for PDCCH transmission for the downlink subframe will be referred to as a PDCCH region. The other OFDM symbols not the OFDM symbols used for the control region correspond to the data region to which a physical downlink shared channel (PDSCH) is allocated. Hereinafter, a resource region available for PDSCH transmission for the downlink subframe will be referred to as a PDSCH region. Examples of the downlink control channel used in the 3GPP LTE include a PCFICH (Physical Control Format Indicator CHannel), a PDCCH (Physical Downlink Control CHannel), and a PHICH (Physical Hybrid ARQ Indicator CHannel). The PCFICH is transmitted from the first OFDM symbol of the subframe, and carries information on the number of OFDM symbols used for transmission of the control channel within the subframe. The PHICH carries HARQ ACK/NACK (acknowledgement/negative-acknowledgement) signal in response to uplink transmission.

The control information transmitted through the PDCCH will be referred to as downlink control information (DCI). The DCI includes resource allocation information for a UE or UE group and other control information. For example, the DCI includes transport format and resource allocation information of a downlink shared channel (DL-SCH), transport format and resource allocation information of an uplink shared channel (UL-SCH), paging information on a paging channel (PCH), system information on the DL-SCH, resource allocation information of upper layer control message such as random access response transmitted on the PDSCH, a set of transmission (Tx) power control commands of individual UEs within a UE group, Tx power control information, and activity information of voice over Internet protocol (VoIP). The size and usage of the DCI carried by one PDCCH are varied depending on DCI formats. The size of the DCI may be varied depending on a coding rate.

A plurality of PDCCHs may be transmitted within a control region. The UE may monitor the plurality of PDCCHs.

The BS determines a DCI format depending on the DCI to be transmitted to the UE, and attaches cyclic redundancy check (CRC) to the DCI. The CRC is masked (or scrambled) with an identifier (for example, radio network temporary identifier (RNTI)) depending on usage of the PDCCH or owner of the PDCCH. For example, if the PDCCH is for a specific UE, the CRC may be masked with an identifier (for example, cell-RNTI (C-RNTI)) of the corresponding UE. If the PDCCH is for a paging message, the CRC may be masked with a paging identifier (for example, Paging-RNTI (P-RNTI)). If the PDCCH is for system information (in more detail, system information block (SIB)), the CRC may be masked with system information RNTI (SI-RNTI). If the PDCCH is for a random access response, the CRC may be masked with a random access RNTI (RA-RNTI). For example, CRC masking (or scrambling) includes XOR operation of CRC and RNTI at a bit level.

The PDCCH is transmitted on aggregation of one or a plurality of continuous control channel elements (CCEs). The CCE is a logic allocation unit used to provide a coding rate based on the status of a radio channel to the PDCCH. The CCE corresponds to a plurality of resource element groups (REGs). For example, one CCE corresponds to nine resource element groups (REGs), and one REG corresponds to four REs. Four QPSK symbols are mapped into each REG. A resource element (RE) occupied by the reference signal (RS) is not included in the REG. Accordingly, the number of REGs within given OFDM symbols is varied depending on the presence of the RS. The REGs are also used for other downlink control channel (that is, PDFICH and PHICH). The number of DCI formats and DCI bits is determined in accordance with the number of CCEs.

CCEs are numbered and used consecutively. In order to simplify a decoding process, the PDCCH having a format that includes n number of CCEs may only start on a CCE fulfilling a CCE number corresponding to a multiple of n. The number of CCEs used for transmission of a specific PDCCH is determined by the BS in accordance with a channel status. For example, one CCE may be required for a PDCCH for a UE (for example, adjacent to BS) having a good downlink channel. However, in case of a PDCCH for a UE (for example, located near the cell edge) having a poor channel, eight CCEs may be required to obtain sufficient robustness. Also, a power level of the PDCCH may be adjusted to correspond to a channel status.

Figure 4:
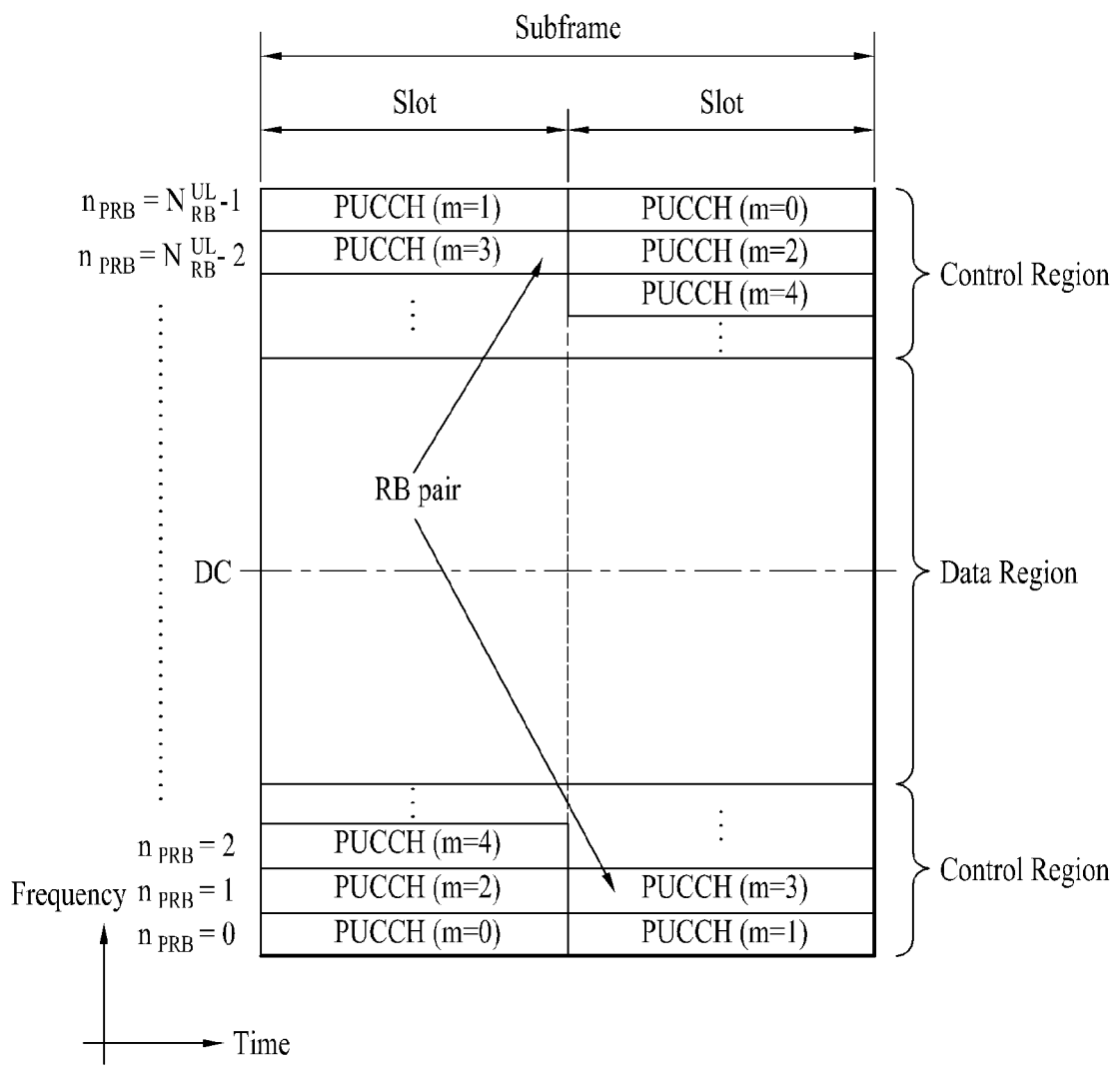
FIG. 4 illustrates the structure of a UL subframe used in a 3GPP LTE(-A) system.

FIG. 4 illustrates the structure of a UL subframe used in a 3GPP LTE(-A) system.

Referring to FIG. 4, a UL subframe may be divided into a data region and a control region in the frequency domain. One or several PUCCHs may be allocated to the control region to deliver UCI. One or several PUSCHs may be allocated to the data region of the UL subframe to deliver user data. The control region and the data region in the UL subframe may also be referred to as a PUCCH region and a PUSCH region, respectively. A sounding reference signal (SRS) may be allocated to the data region. The SRS is transmitted on the last OFDM symbol of the UL subframe in the time domain and is transmitted on a data transmission band, that is, a data region, of the UL subframe in the frequency domain. SRSs of several UEs, which are transmitted/received on the last OFDM symbol of the same subframe, can be distinguished according to a frequency location/sequence.

If a UE employs an SC-FDMA scheme in UL transmission, in a 3GPP LTE release-8 or release-9 system, a PUCCH and a PUSCH cannot be simultaneously transmitted on one carrier in order to maintain a single carrier property. In a 3GPP LTE release-10 system, support/non-support of simultaneous transmission of a PUCCH and a PUSCH may be indicated by higher layers.

In the UL subframe, subcarriers distant from a direct current (DC) subcarrier are used as the control region. In other words, subcarriers located at both ends of a UL transmission bandwidth are used to transmit UL control information. A DC subcarrier is a component unused for signal transmission and is mapped to a carrier frequency $f_0$ in a frequency up-conversion process. A PUCCH for one UE is allocated to an RB pair belonging to resources operating in one carrier frequency and RBs belonging to the RB pair occupy different subcarriers in two slots. The PUCCH allocated as above will be expressed as that the pair of RBs allocated to the PUCCH is subjected to frequency hopping at the slot boundary. However, if frequency hopping is not applied to the RB pair, the RBs forming the RB pair occupy the same subcarriers at the two slots.

The size and usage of UCI carried by one PUCCH may be changed according to PUCCH format and the size of the UCI may be changed according to coding rate. For example, the following PUCCH format may be defined.

TABLE 4

| PUCCH format | Modulation scheme | Number of bits per subframe | Usage | Etc. |
|---|---|---|---|---|
| 1 | N/A | N/A (exist or absent) | SR (Scheduling Request) | |
| 1a | BPSK | 1 | ACK/NACK or SR + ACK/NACK | One codeword |
| 1b | QPSK | 2 | ACK/NACK or SR + ACK/NACK | Two codewords |
| 2 | QPSK | 20 | CQI/PMI/RI | Joint coding ACK/NACK (extended CP) |
| 2a | QPSK + BPSK | 21 | CQI/PMI/RI + ACK/NACK | Normal CP only |
| 2b | QPSK + QPSK | 22 | CQI/PMI/RI + ACK/NACK | Normal CP only |
| 3 | QPSK | 48 | ACK/NACK or SR + ACK/NACK or CQI/PMI/RI + ACK/NACK | |

Referring to Table 2, PUCCH format 1 series and PUCCH format 3 series are mainly used to transmit ACK/NACK information and PUCCH format 2 series is mainly used to carry channel state information (CSI) such as channel quality indicator (CQI)/precoding matrix indicator (PMI)/rank indicator (RI).

FIG. 8 to FIG. 11 exemplarily show UCI transmission according to PUCCH formats.

In a 3GPP LTE(-A) system, a DL/UL subframe with a normal CP consists of two slots each including 7 OFDM symbols and a DL/UL subframe with an extended CP consists of two slots each having 6 OFDM symbols. Since the number of OFDM symbols per subframe varies with CP length, a structure in which a PUCCH is transmitted in a UL subframe also varies with the CP length. Accordingly, a UCI transmission method of a UE in the UL subframe depends on a PUCCH format and the CP length.

Figure 5:
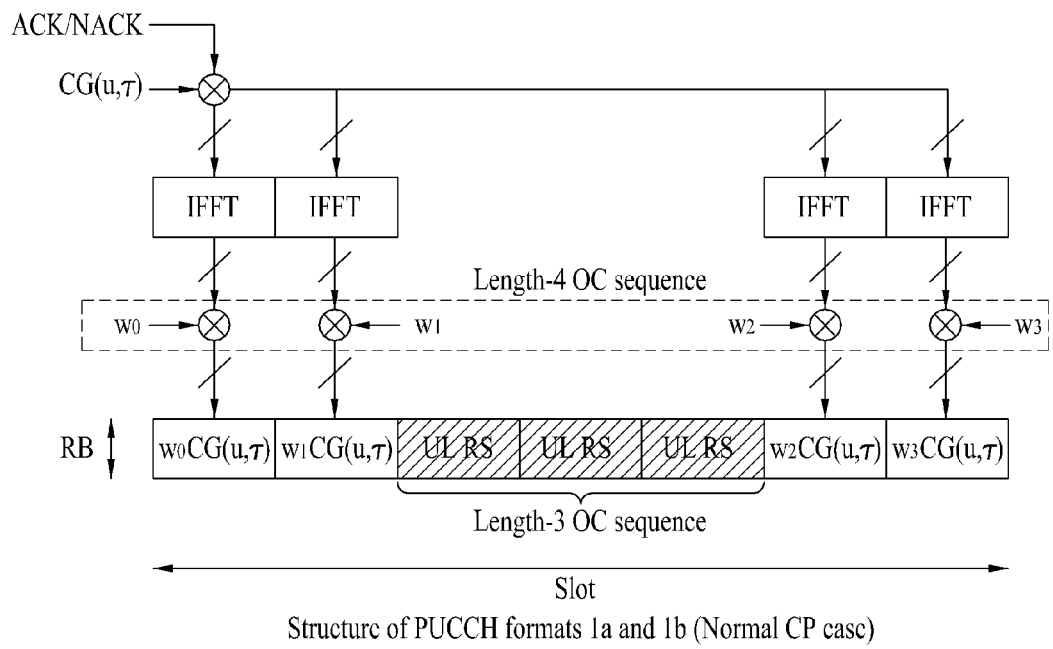
FIGS. 5 to 8 illustrate UCI transmission according to PUCCH formats.
Figure 6:
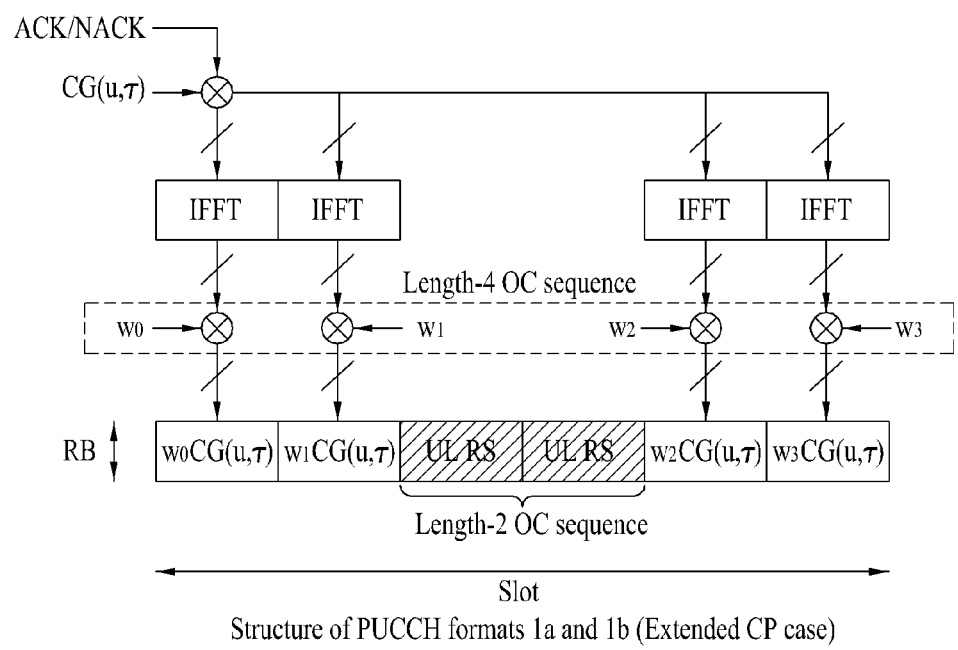

FIG. 5 illustrates an example of transmitting ACK/NACK information using PUCCH format 1a/1b in a UL slot with a normal CP and FIG. 6 illustrates an example of transmitting ACK/NACK information using PUCCH format 1a/1b in a UL slot with an extended CP.

Referring to FIGS. 5 and 6, control information transmitted using PUCCH formats 1a and 1b is repeated with the same contents on a slot basis in a subframe. In each UE, ACK/NACK signals are transmitted on different resources which are configured with different cyclic shifts (CSs) (frequency domain codes) of a computer-generated constant amplitude zero autocorrelation (CG-CAZAC) sequence and orthogonal covers (OCs) or orthogonal cover codes (OCCs) (time domain spread codes). An OCC is also referred to as an orthogonal sequence. An OC includes, for example, a Walsh/DFT OC. Provided that the number of CSs is 6 and the number of OCs is 3, a total of 18 PUCCHs may be multiplexed in the same physical resource block (PRB) based on a single antenna port. Orthogonal sequences $w_0$, $w_1$, $w_2$ and $w_3$ may be applied in either an arbitrary time domain (after FFT modulation) or an arbitrary frequency domain (before FFT modulation). In the 3GPP LTE(-A) system, a PUCCH resource for ACK/NACK transmission is expressed as a combination of the position of a time-frequency resource (e.g. PRB), a CS of a sequence for frequency spreading, and an (quasi) OC for time spreading and each PUCCH resource is indicated using a PUCCH resource index (also referred to as a PUCCH index). A PUCCH format 1 series for scheduling request (SR) transmission is the same in a slot level structure as PUCCH format 1a and 1b and differs only in a modulation method from the PUCCH formats 1a and 1b.

Figure 7:
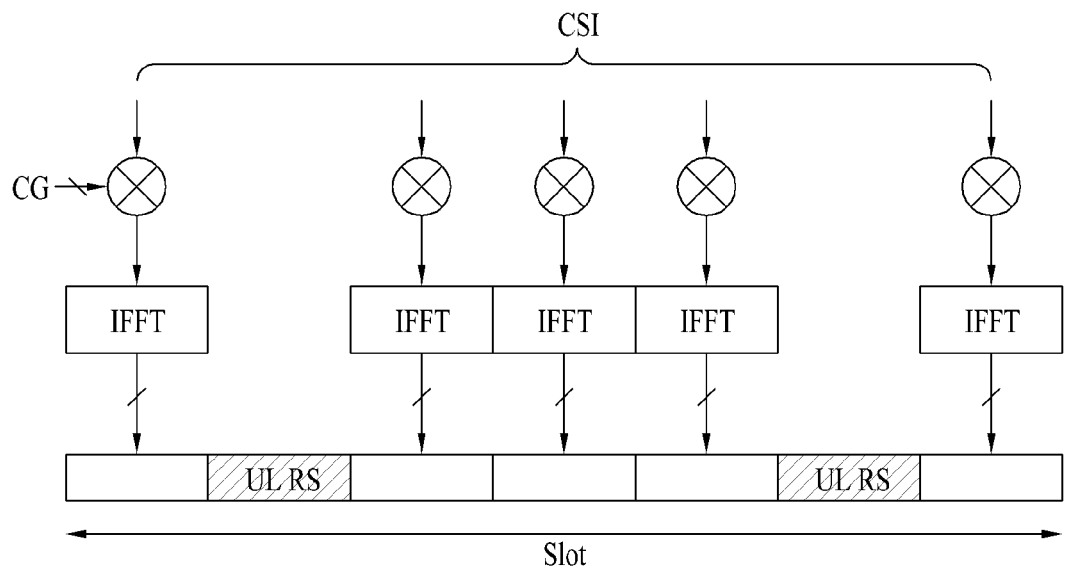
Figure 8:
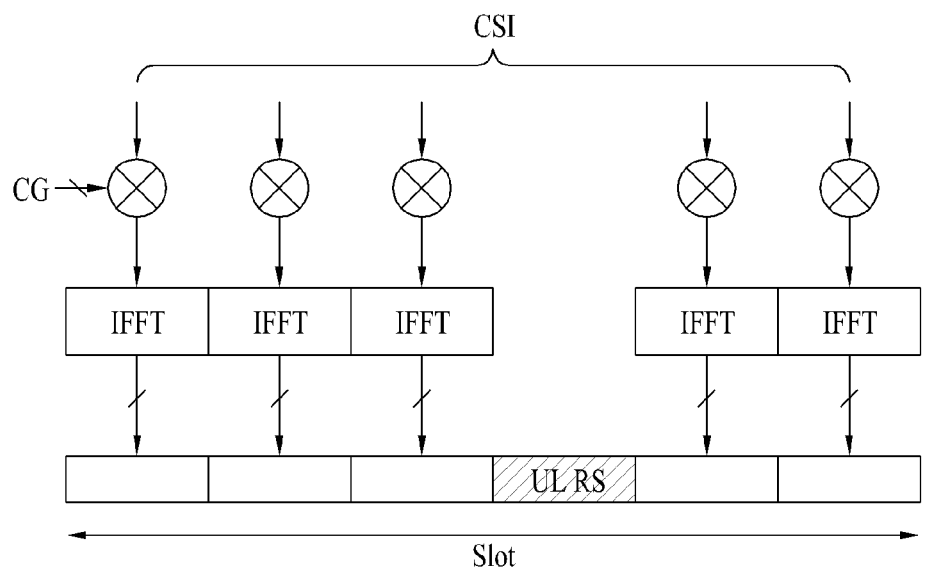

FIG. 7 illustrates an example of transmitting channel state information (CSI) using PUCCH formats 2/2a/2b in a UL slot with a normal CP and FIG. 8 illustrates an example of transmitting CSI using PUCCH formats 2/2a/2b in a UL slot with an extended CP.

Referring to FIGS. 7 and 8, in a normal CP, one UL subframe includes 10 OFDM symbols except for symbols carrying UL RSs. CSI is coded into 10 transmission symbols (also referred to as complex-valued modulation symbols) through block coding. The 10 transmission symbols are mapped to the 10 OFDM symbols, respectively, and then are transmitted to a BS.

PUCCH format 1/1a/1b and PUCCH format 2/2a/2b may carry only up to a predetermined number of bits. However, according to carrier aggregation, increase in the number of antennas, and introduction of a TDD system, a relay system, and a multi-node system, the amount of UCI increases and thus a PUCCH format capable of carrying much more UCI than UCI in PUCCH format 1/1a/1b/2/2a/2b has been introduced. This format is referred to as PUCCH format 3. PUCCH format 3 may be implemented by applying channel selection for selecting any one of a plurality of PUCCH resources and dual Reed-Muller coding to PUCCH format 1/1a/1b/2/2a/2b.

To improve system performance, introduction of a remote radio head (RRH) has newly been discussed. Additionally, since a plurality of serving component carriers (CCs) may be configured for one UE under carrier aggregation, a method for transmitting UL/DL grant for other CCs on a serving CC having good channel status has been discussed. In this way, if a CC carrying the UL/DL grant, which is scheduling information, is different from a CC on which UL/DL transmission corresponding to the UL/DL grant is performed, this is referred to as cross-carrier scheduling. If RRH technology and cross-carrier scheduling technology are introduced, the amount of PDCCHs that the BS should transmit gradually increases. However, since the size of a control region to which the PDCCHs can be transmitted is the same as that of the conventional art, PDCCH transmission acts as a system performance bottleneck. Accordingly, in order to prevent PDCCH transmission from restricting system performance, PDCCH transmission using a PDSCH region of a DL subframe has been discussed. PDCCHs according to legacy 3GPP LTE standard may be applied to a PDCCH region of the DL subframe. Meanwhile, PDCCHs may be additionally allocated using some resources of the PDSCH region. When a PDCCH is transmitted in the PDSCH region, such a PDCCH may be used for operation based on a DMRS, which is a UE-specific RS, as well as for transmit diversity or spatial multiplexing transmission. Hereinafter, for discrimination from an existing PDCCH transmitted in front OFDM symbol(s) of the DL subframe, a PDCCH which is transmitted in rear OFDM symbols (PDSCH region) of the DL subframe will be referred to as an enhanced PDCCH (E-PDCCH) or an advanced PDCCH (A-PDCCH). A PDSCH/PUSCH scheduled by the E-PDCCH is also referred to as an E-PDSCH/E-PUSCH. The PDCCH and E-PDCCH may be managed by different CCE indexes. In this case, even when the PDCCH and E-PDCCH are transmitted on CCEs having the same CCE index, a CCE of the PDCCH and a CCE of the E-PDCCH may mean different CCEs.

Meanwhile, in a legacy communication system, a UL signal can be appropriately received by a BS only when UL transmission is performed over two slots of a UL subframe. Therefore, in the legacy communication system, PUSCH transmission according to UL grant carried by a PDCCH and/or PUCCH transmission carrying UCI associated with a PDSCH has been performed in two slots. Hereinafter, PUCCH/PUSCH transmission over two slots of a subframe will be referred to as subframe-based scheduling/transmission. As UL enhancement technology has been developed/introduced, UL transmit energy required for the BS to appropriately receive UL transmission has been reduced. Accordingly, although UL transmission is performed only over one of the two slots of the UL subframe as opposed to the legacy system, if the UL enhancement technology is applied, it is actually possible to achieve the same performance as the case in which UL transmission is performed over two slots in the legacy system. In consideration of such a situation, the present invention proposes methods for performing UL transmission using a PDCCH or an E-PDCCH on a slot basis rather than on a subframe basis. That is, the present invention provides embodiments of a method and apparatus for performing UL transmission/reception on a slot basis in a special situation such as a good UL channel state although DL transmission/reception is performed on a subframe basis. A PUCCH and/or a PUSCH may be transmitted in any one of the slots. Hereinafter, embodiments of the present invention will be described by referring to PUCCH/PUSCH transmission performed in one slot of a subframe as slot-based scheduling/transmission. For reference, a system performing subframe-based UL transmission/reception using a PDCCH is referred to as a legacy system and a system performing UL transmission/reception according to a PDCCH or an E-PDCCH is referred to as an advanced system. In embodiments of the present invention, a UE according to the advanced system, in other words, an advanced UE, may be configured to perform both subframe-based UL transmission and slot-based UL transmission. A UE configured to perform only subframe-based UL transmission is a legacy UE compared with an advanced UE configured to receive an E-PDCCH and/or to perform slot-based UL transmission. In some cases, the legacy UE may be scheduled by the PDCCH and the advanced UE may be scheduled by the E-PDCCH.

While embodiments of the present invention will be described based on the case applied to communication between a BS and a UE using a PDCCH/E-PDCCH hereinbelow, the embodiments of the present invention can be applied to a relay as well as a normal UE. A relay refers to a device and/or a point for extending a service area of a BS or smoothly providing a service of a BS by being installed in a shadow area. The relay may be referred to by other terms such as a relay node (RN) and relay station (RS). In terms of a UE, the RN is a portion of a radio access network and operates like a BS except in some cases. A BS that transmits signals to the RN or receives signals from the RN is called a donor BS. The RN is connected to the donor BS wirelessly. In terms of the BS, the RN operates like the UE except in some cases (e.g. the case in which DL control information is transmitted through a relay PDCCH (R-PDCCH), not through a PDCCH). Accordingly, the RN includes both a physical layer entity used for communication with the UE and a physical layer entity used for communication with the donor BS. Transmission from the BS to the RN, hereinafter referred to as BS-to-RN transmission, occurs in a DL subframe and transmission from the RN to the BS, hereinafter referred to as RN-to-BS transmission, occurs in a UL subframe. Meanwhile, BS-to-RN transmission and RN-to-BS transmission occur in a DL frequency band and RN-to-BS transmission and UE-to-RN transmission occur in a UL frequency band. In the present invention, the RN or UE may communicate with a network to which one or more BSs belong through one or more BSs.

For convenience of description, the embodiments of the present invention will be explained hereinbelow by referring to all of a PDCCH, an E-PDCCH, and an R-PDCCH to as a PDCCH. Accordingly, the embodiments of the present invention will be described by referring to a CCE belonging to any one of the PDCCH, E-PDCCH, or R-PDCCH as a CCE without discrimination.

<Slot Usage Indication>

Figure 9:
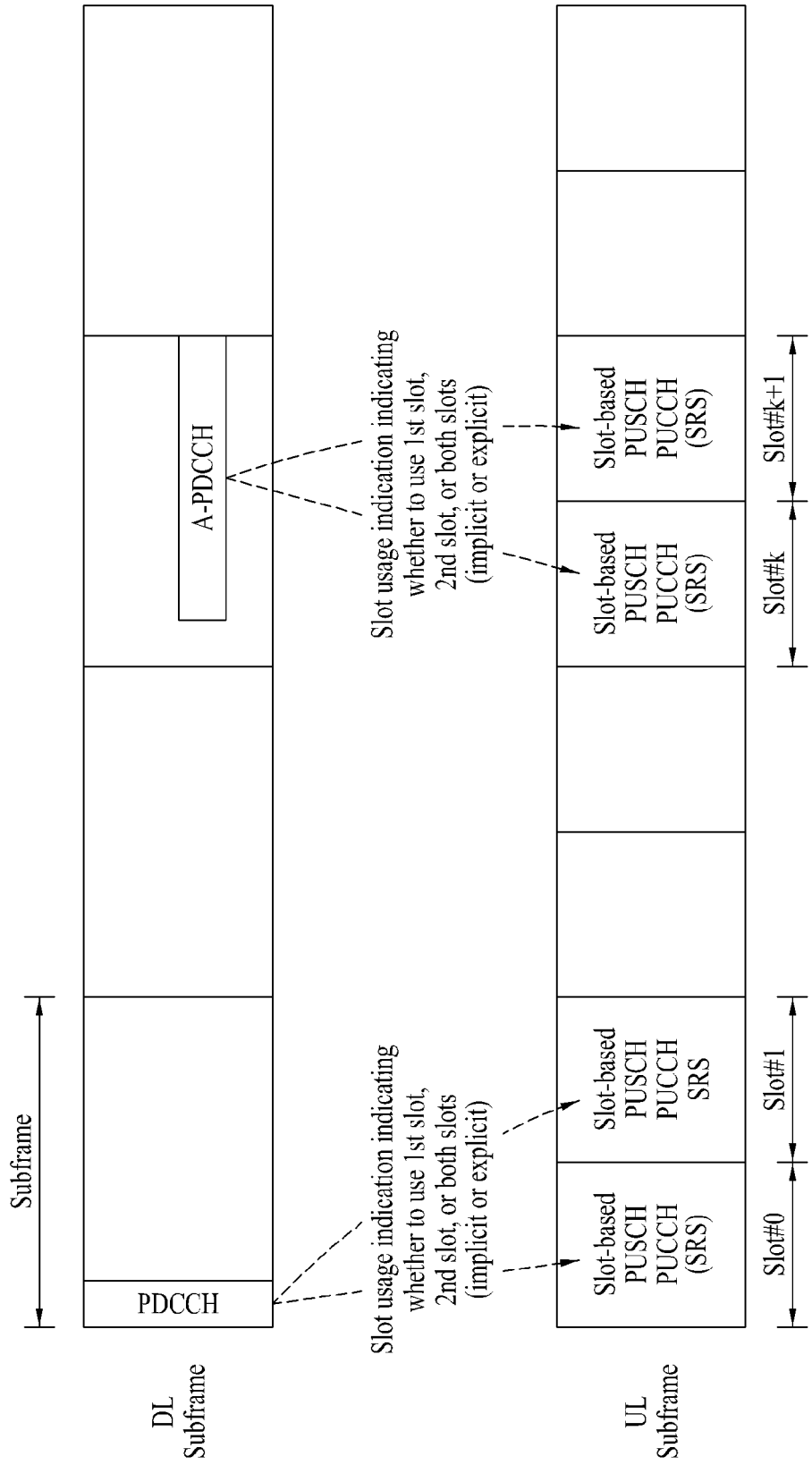
FIG. 9 illustrates slot-based PUSCH/PUCCH/SRS transmission using a slot usage indication according to an embodiment of the present invention.

FIG. 9 illustrates slot-based PUSCH/PUCCH/SRS transmission using a slot usage indication according to an embodiment of the present invention.

Since a slot-based transmission scheme is different from a conventional subframe-based transmission scheme, it is desirable to pre-configure the slot-based transmission scheme in order for a UE to perform slot-based UL transmission. A BS configures a slot-based transmission mode prior to slot-based scheduling and signals the slot-based transmission mode to the UE. For example, if a UL channel state of the UE does not reach a specific threshold value, the BS may configure a subframe-based transmission mode (hereinafter, a subframe mode) and, if the UL channel state of the UE exceeds the specific threshold value, the BS may configure a slot-based transmission mode (hereinafter, a slot mode). If the slot mode is configured, the UE may perform UL transmission on a slot basis. If the BS configures the slot mode, the UE may be forced to perform UL transmission on a slot basis. However, it is possible for the UE to determine whether to perform slot-based UL transmission or subframe-based UL transmission according to a channel environment. Notably, if the UE is configured to determine slot-based transmission or subframe-based transmission, the BS may be designed to know the determination criterion in advance.

A method for indicating a slot mode by the BS to the UE may be variously configured. For example, the BS may configure the UE with the slot mode through radio resource control (RRC) signaling. Here, the BS should indicate whether a slot used by the UE to perform UL transmission is the first slot or the second slot. Upon configuring the slot mode through RRC signaling, the BS may semi-statically indicate which slot should be used.

The BS may dynamically inform, using a specific bit (e.g. a 1-bit in a PDCCH DCI format), the UE of a slot in which transmission should be performed at every scheduling timing.

A DCI format or higher-layer signaling may carry slot usage indication information that is defined, for example, as follows.

TABLE 3

| Bit field | Indication |
|---|---|
| 0 | 1$^{st}$ slot transmission |
| 1 | 2$^{nd}$ slot transmission |

Referring to Table 3, for example, it may be predetermined between the UE and the BS that a specific bit set to '0' indicates an even-numbered slot or the first slot of a UL subframe and a specific bit set to '1' indicates an odd-numbered slot or the second slot of the UL subframe.

As another example, two bits may be used for the slot usage indication. For instance, the BS may transmit slot usage indication information to the UE according to the following table.

TABLE 4

| Bit field | Indication |
|---|---|
| 00 | 1$^{st}$ slot transmission |
| 01 | 2$^{nd}$ slot transmission |
| 10 | Both slot transmission |
| 11 | reserved |

Referring to Table 4, the BS may inform the UE of any one of two slots in a subframe, using 00 or 01 or may inform the UE that all of the two slots are used for UL transmission, using 10.

As another example, the BS may transmit the slot usage indication information to the UE according to, for example, the following table.

TABLE 5

| Bit field | Indication |
|---|---|
| 00 | 1$^{st}$ slot transmission |
| 01 | 2$^{nd}$ slot transmission |
| 10 | Both slot transmission |
| 11 | One slot transmission (toggled) |

Referring to Table 5, among four states that can be expressed by two bits, an information bit 11 corresponding to a state, except for information bits 00, 01, and 10 respectively indicating the first slot, the second slot, and all of the first and second slots, may be defined to indicate UL transmission in one slot while alternating the first slot transmission and the second slot transmission. In this case, a transmission problem associated with a specific slot can be solved. As described with reference to FIG. 4, in subframe-based UL transmission, an SRS is always transmitted in the second slot of a subframe. In this way, when the SRS is always transmitted only in the second slot, if the BS indicates transmission in the first slot, SRS transmission may be complicated. This is because the UE should stop to perform UL transmission on symbols from the first symbol of the second slot to a symbol immediately prior to the last symbol of the second slot after performing UL transmission in the first slot and should transmit the SRS in the last symbol of the second slot. If it is assumed that the UE receives slot usage indication information indicating that two slots should be alternately used for UL transmission and SRS transmission is configured for the UE, the UE does not transmit the SRS when SRS transmission timing corresponds to the first slot and transmits the SRS on the last OFDM symbol of the second slot when SRS transmission timing corresponds to the second slot. Here, alternate transmission may refer to alternate usage of the first slot and the second slot in terms of a hybrid automatic retransmission request (HARQ) process associated with a HARQ operation of the UE. Alternatively, alternate transmission may refer to a method for performing UL transmission in association with a subframe number or a slot index. For example, in an even-numbered subframe, the first slot may be used for UL transmission and, in an odd-numbered subframe, the second slot may be used for UL transmission. The SRS may be transmitted periodically and/or aperiodically. In consideration of periodic SRS transmission, it may be favorable to determine a slot used for UL transmission related to a subframe.

A mapping relationship between the information bit and the slot usage indication of Table 3 to Table 5 are purely exemplary and may be differently configured.

The above slot usage indication has been described as an example in which the BS informs the UE of a slot to be used by the UE under the premise that a slot mode is configured for the UE. However, even if the slot mode is not configured, an additional indication bit may be added to a PDCCH DCI format so that the added indication bit may function as the slot usage indication indicating in which slot ACK/NACK for a PDSCH corresponding to DL grant scheduled (i.e. carried) by the PDCCH should be transmitted. If the slot usage indication is applied to PUCCH transmission, the indication bit may be added to UL grant. That is, a slot in which UL transmission is to be performed may be indicated by any one of the UL grant and DL grant.

Hereinabove, the case in which the BS explicitly transmits the slot usage indication to the UE has been described. However, if a slot used in a slot mode is distinguished by a special criterion such as a DCI format or a CoMP transmission point in a natural way, since which slot should be used for UL transmission can be implicitly known to the UE even when the UE does not explicitly receive the slot usage indication, the slot usage indication may not be transmitted to the UE.

The slot usage indication may be implicitly configured by linkage between a CCE and ACK/NACK, instead of explicit signaling. Details of implicit configuration of the slot usage indication will be described later in the <PUCCH resource reservation> section.

<UE Grouping>

Figure 10:
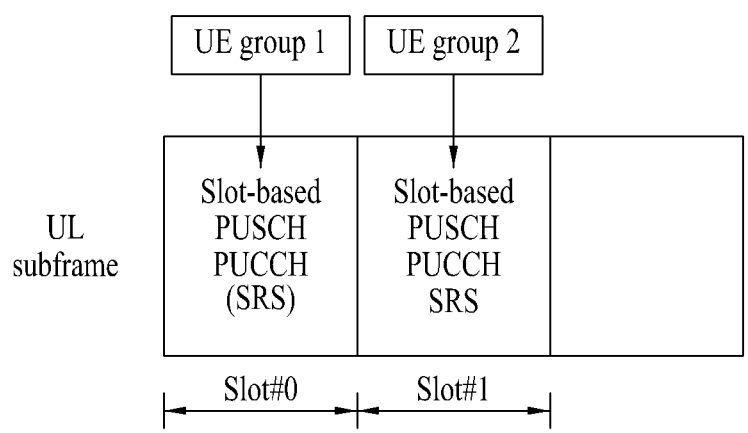
FIG. 10 illustrates an example in which a BS uses a slot usage indication according to the present invention.

FIG. 10 illustrates an example in which a BS uses a slot usage indication according to the present invention.

The above-described embodiments regarding the slot usage indication may also be used when the BS adjusts UEs scheduled in a specific slot, as well as when the BS causes UEs to use a specific slot.

Referring to FIG. 10, provided that 10 UEs use a slot mode, the BS may configure or indicate that some UEs (UE group 1) should perform UL transmission in the first slot and the other UEs (UE group 2) should perform UE transmission in the second slot. Thus, the embodiments regarding the slot usage indication can be used to prevent UEs from concentrated in a specific slot during scheduling. That is, according to the present invention, UEs are dividedly allocated in two slots and thus scheduling flexibility can increase.

<Subframe Bundling>

Figure 11:
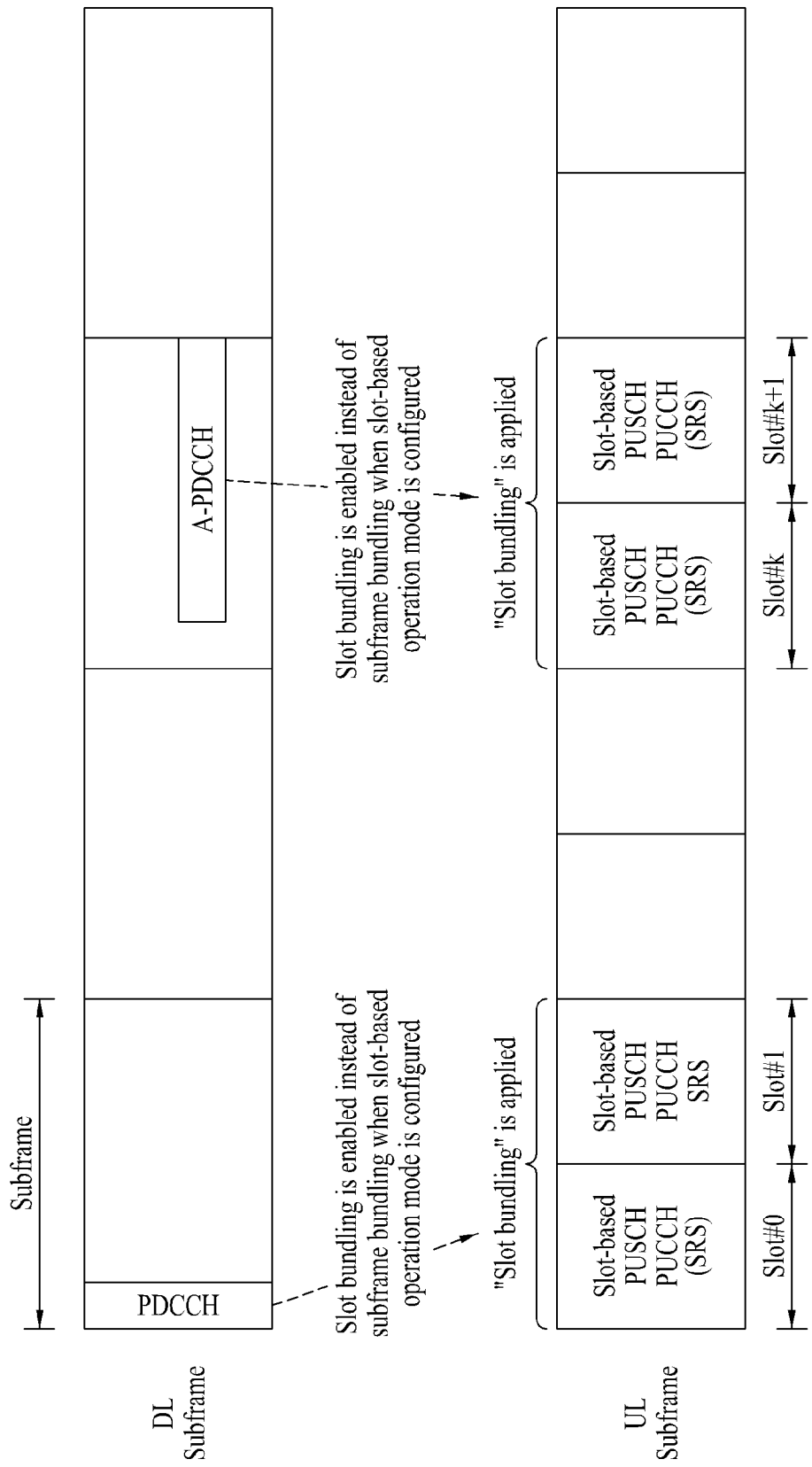
FIG. 11 illustrates UL transmission when a slot mode is configured in a system using subframe bundling.

FIG. 11 illustrates UL transmission when a slot mode is configured in a system using subframe bundling.

Subframe bundling refers to a scheme for transmitting a transmission channel carrying the same data with a different redundancy version (RV) in a predetermined number of consecutive subframes in the time domain. If subframe bundling is configured, the UE transmits a PUSCH in a predetermined of consecutive UL subframes (e.g. 4 subframes). If the UE transmits the PUSCH only once in the case in which the UE is distant from the BS or a radio link is poor, since transmit power of the UE is restricted, a situation in which the BS cannot appropriately receive the PUSCH may occur. In this case, the BS may configure the UE so as to operate in a subframe bundling mode.

In an embodiment of the present invention, a slot-mode configured UE automatically operate in slot bundling instead of subframe bundling. Namely, referring to FIG. 11, if a slot-based operating mode, that is, slot mode, is configured, slot bundling is enabled instead of subframe bundling. Upon receiving slot usage indication information, the UE, which has been configured to operate in subframe bundling, may operate in a slot bundling mode instead of subframe bundling. Upon receiving information indicating that subframe bundling should be performed from the BS, the UE, which has been configured to operate in a slot mode prior to configuration of subframe bundling, may operate in slot bundling mode instead of subframe bundling.

The slot-mode for the UE may be configured by a higher-layer (e.g. RRC layer) signal. Alternatively, a bit may be added to a PDCCH DCI format and/or an E-PDCCH DCI format so that some of states indicated by the added bit may be used to indicate a subframe mode and the other states may be used to indicate a slot mode. For example, 00 or 11 may be defined to indicate the subframe mode and 01 or 10 may be defined to indicate the slot mode.

The BS configuring the slot mode for the UE may inform the UE to which slot a PUSCH is to be transmitted according to a slot usage indication bit. In this case, the slot usage indication bit may be used not only as information about a slot usage indication but also as information indicating that subframe bundling should be interpreted as slot bundling. Referring to FIG. 11, when slot bundling is enabled, the UE may transmit PUSCHs in a predetermined number of consecutive slots starting from the first slot including a PUSCH transmission scheduled slot.

According to this embodiment, if the BS commands the UE to operate in a subframe bundling mode, the UE automatically interprets subframe bundling as slot bundling and operates in slot bundling. Therefore, the BS does not need to signal information indicating that the UE should operate in slot bundling to the UE and thus DL signaling overhead is reduced.

<PUCCH Resource Reservation>

UL data is scheduled by a PDCCH, an E-PDCCH, or an R-PDCCH and is transmitted/received in a data region of a subframe. In contrast, in the case of a PUCCH, the UE is assigned a PUCCH resource for UCI transmission from the BS by higher-layer signaling, dynamic control signaling, or an implicit scheme. In subframe-mode UL transmission, a PRB pair is used for PUCCH transmission in one subframe. Accordingly, in a legacy 3GPP LTE(-A) system, two PRBs forming one PRB pair are actually linked to the same PUCCH resource. Since a legacy PUCCH resource is configured such that one PUCCH resource is configured over two slots in one subframe, a PRB located in the first slot of one PRB pair and a PRB located in the second slot of the PRB pair cannot be allocated to different UEs or UE groups. In contrast, in slot-based PUCCH transmission, since a PUCCH can be transmitted only in one slot, a PUCCH resource for slot-based PUCCH transmission needs to be defined and determined as opposed to a PUCCH resource used for subframe-based PUCCH transmission. Hereinafter, embodiments of the present invention regarding a method for performing slot-based PUCCH transmission with respect to each of PUCCH format 1 series, 2 series, and 3 series will be described.

PUCCH Format 1 Series

In the legacy 3GPP LTE(-A) system, in the case of PUCCH format 1 series (hereinafter, PUCCH format 1), a PUCCH resource for ACK/NACK transmission (hereinafter, an ACK/NACK PUCCH resource) is not previously allocated to each UE and, instead, a plurality of UEs in a cell dividedly uses a plurality of PUCCH resources at each PUCCH transmission timing. Specifically, A PUCCH resource used by the UE for ACK/NACK transmission is dynamically determined based on a PDCCH associated with corresponding ACK/NACK transmission. In the legacy 3GPP LTE(-A) system, an ACK/NACK PUCCH resource is linked with a CCE index and is dynamically determined according to a PDCCH CCE index on a subframe basis. In the 3GPP LTE(-A) system, a PDCCH includes a PDCCH with a corresponding PDSCH and a PDCCH for SPS release without a corresponding PDSCH. Irrespective of whether a PDCCH is a normal PDCCH with a PDSCH or a PDCCH for SPS release, an entire region in which a PDCCH is transmitted in each DL subframe includes a plurality of CCEs and a PDCCH transmitted to the UE is composed of one or more CCEs. The UE transmits ACK/NACK for a PDSCH and/or a PDCCH on a PUCCH resource linked with a specific CCE (e.g. first CCE) among CCEs constituting a PDCCH received thereby. That is, the UE applies an OC and a CS corresponding to an allocated PUCCH resource to ACK/NACK information so as to be transmitted in each PRB of a corresponding PRB pair. An ACK/NACK transmission timing is a UL subframe after a predetermined number of subframes (i.e. k subframes) starting from a DL subframe in which a PDCCH is received. For example, in FDD, an ACK/NACK PUCCH may be transmitted in the fourth subframe after a subframe in which the PDCCH is received and, in TDD, the ACK/NACK PUCCH may be transmitted in a subframe determined based on k which is defined according to a TDD DL-UL configuration and a subframe number.

Figure 12:
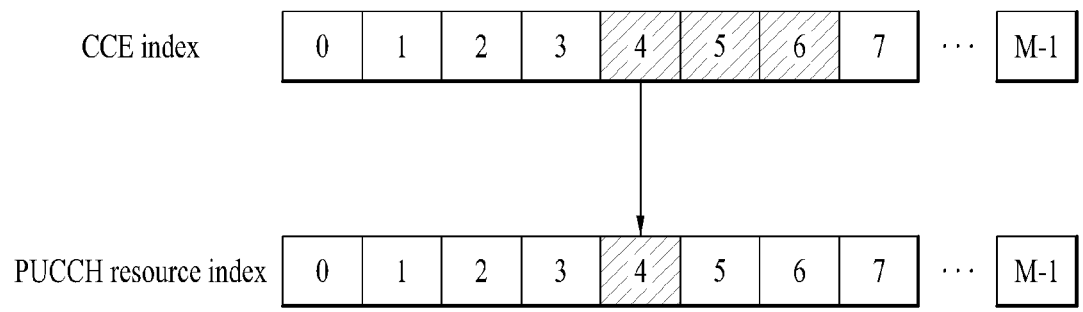
FIG. 12 illustrates an example of determining a PUCCH resource for ACK/NACK in a 3GPP LTE-(A) system.

FIG. 12 illustrates an example of determining a PUCCH resource for ACK/NACK in a 3GPP LTE-(A) system. Particularly, in FIG. 12, a maximum of M CCEs is present in DL and a maximum of M PUCCH resources are reserved in UL.

Referring to FIG. 12, each PUCCH resource index corresponds to a PUCCH resource for ACK/NACK. As illustrated in FIG. 12, if it is assumed that scheduling information about a PDSCH is transmitted to the UE through a PDCCH composed of CCEs of indexes 4 to 6 and the CCE of index 4 is linked to PUCCH resource index 4, the UE transmits ACK/NACK to the BS through PUCCH resource index 4 corresponding to CCE index 4 constituting the PDCCH. More specifically, a PUCCH resource index for transmission through two antenna ports $p_0$ and $p_1$ in the 3GPP LTE(-A) system is determined as follows.

$$n_{PUCCH}^{(1,\tilde{p}=p0)} + n_{CCE} + N_{PUCCH}^{(1)} \qquad \text{[Equation 1]}$$

$$n_{PUCCH}^{(1,\tilde{p}=p1)} = n_{CCE} + 1 + N_{PUCCH}^{(1)} \qquad \text{[Equation 2]}$$

Here, $n^{(1,\tilde{p}=p0)}_{PUCCH}$ denotes an ACK/NACK PUCCH resource index (i.e. number) to be used by antenna port $p_0$, $n^{(1,\tilde{p}=p1)}_{PUCCH}$ denotes an ACK/NACK PUCCH resource index to be used by antenna port $p_1$, and $N^{(1)}_{PUCCH}$ denotes a signaling value received from higher layers. $n_{CCE}$ is the lowest of CCE indexes used for PDCCH transmission. For example, if a CCE aggregation level is 2 or more, the first CCE index among a plurality of CCE indexes aggregated for PDCCH transmission is used to determine an ACK/NACK PUCCH resource.

If an ACK/NACK PUCCH resource is determined as in a legacy 3GPP LTE(-A) system, since only one ACK/NACK PUCCH resource is reserved in two slots of a corresponding subframe, slot-based PUCCH transmission proposed in the present invention cannot be supported. Accordingly, a PUCCH resource needs to be reserved on a slot basis, for slot-based PUCCH transmission.

The simplest method for slot-based resource reservation includes a method for securing, for the first slot, a PUCCH format 1/1a/1b resource, i.e. an ACK/NACK PUCCH resource, in association with a CCE index of a DL PDCCH related to first slot transmission and determining, for the second slot, the ACK/NACK PUCCH resource by adding a predetermined offset value to a PUCCH resource index of the first slot. In this case, the offset value may be one fixed value or a set of offset values having multiple values. Alternatively, for the second slot, available ACK/NACK PUCCH resources may be pre-reserved by RRC signaling. In this case, since a PUCCH resource of the second slot cannot be dynamically changed, the PUCCH resource should be suitably used.

As another method for resource reservation, all ACK/NACK PUCCH resources may be determined depending upon RRC signaling irrespective of the location of a slot. That is, PUCCH resources configured by RRC signaling may be persistently used for ACK/NACK PUCCH transmission. However, this method has a disadvantage of unnecessarily wasting resources due to persistent reservation. That is, PUCCH resources reserved by RRC signaling even at a non-ACK/NACK transmission timing will not be used for PUCCH transmission of other UEs. Hereinafter, embodiments of the present invention regarding PUCCH resource reservation for PUCCH format 1/1a/1b will be described. In the following description, it is assumed that one PUCCH resource for an advanced UE is configured in one PRB and one PUCCH resource for a legacy UE is configured in one PRB pair.

Figure 13:
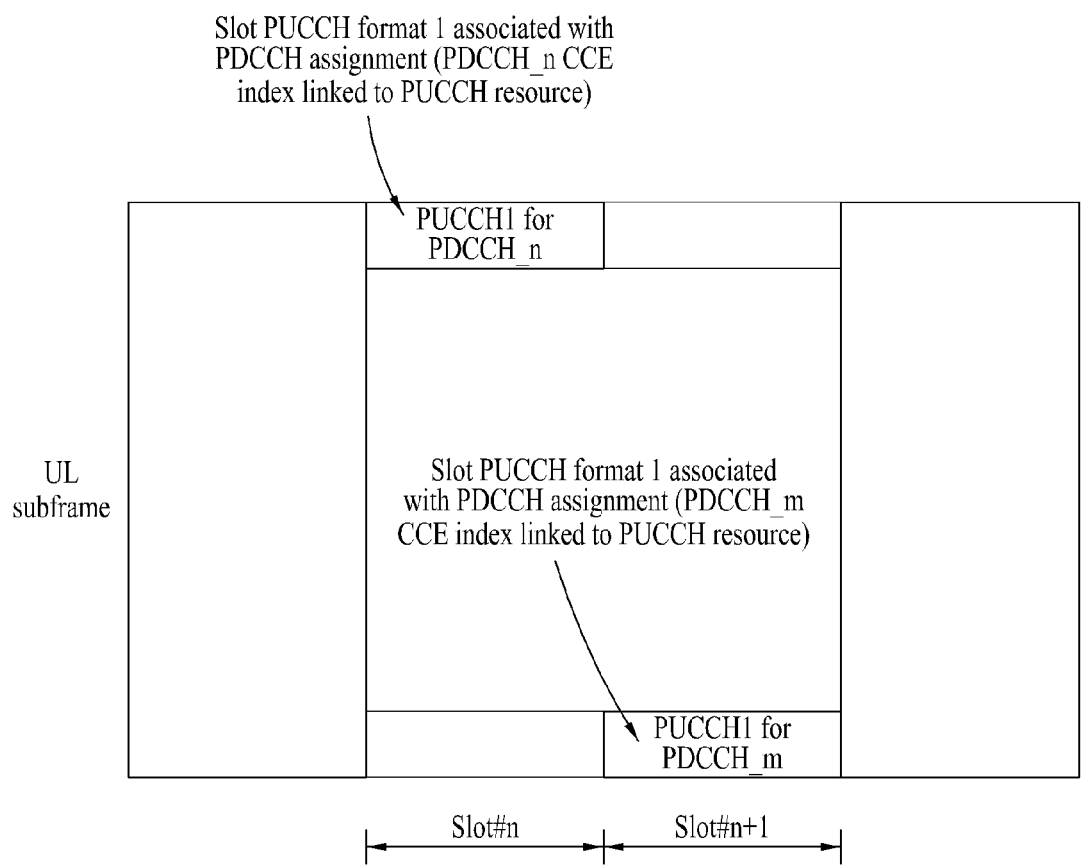
FIGS. 13 and 14 illustrate an embodiment of the present invention for mapping CCE indexes to PUCCH format 1/1a/1b.
Figure 14:
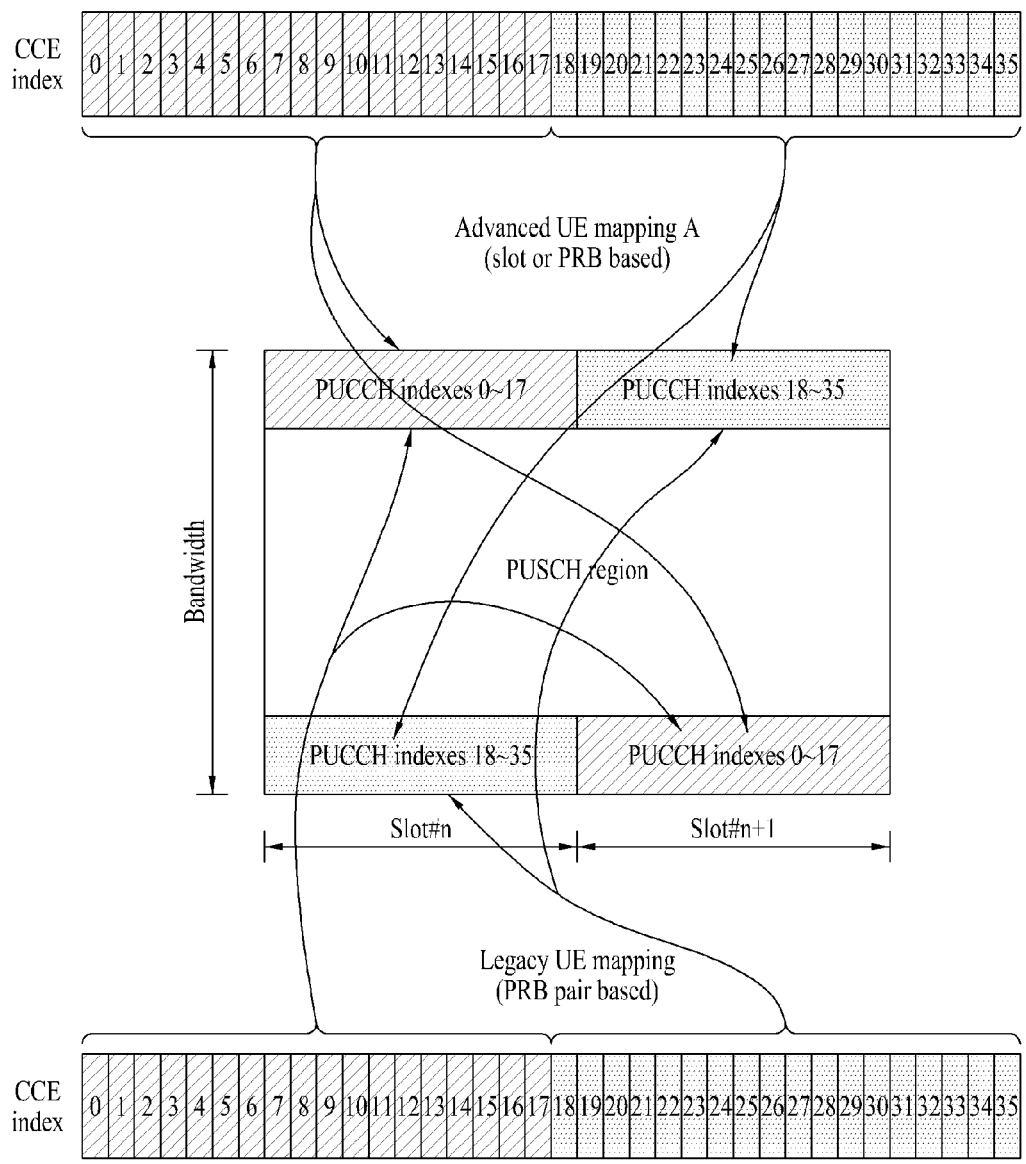

A) Embodiment in which Multiplexing with a Legacy System can be Performed without Scheduling Restrictions Although Resources are Wasted Table 6, FIG. 13, and FIG. 14 illustrate an embodiment of the present invention for mapping CCE indexes to PUCCH format 1/1a/1b.

TABLE 6

| CCE Index | ACK/NACK PUCCH resource index |
| --- | --- |
| 0 | 0 (slot #n) |
| 1 | 1 (slot #n + 1) |
| 2 | 2 (slot #n) |
| 3 | 3 (slot #n + 1) |
| 4 | 4 (slot #n) |
| ... | ... |
| N − 1 | N − 1 (slot #n + 1) |

Referring to Table 6, FIG. 13, and FIG. 14, if it is considered that a PUCCH is transmitted only in one of two slots of a UL subframe, each DL grant CCE index (i.e. an index of a CCE belonging to a PDCCH carrying DL grant) and a PUCCH resource may be mapped in one-to-one correspondence with each other irrespective of which slot is used for PUCCH transmission. Since a slot in which a PUCCH is to be transmitted is designated by RRC signaling or DCI, designation of the slot for PUCCH transmission does not have an effect on determination of a CCE index associated with the PUCCH. For reference, although Table 6 shows the case in which a scheduler alternately designates slot #n and slot #n+1 through slot usage indication information, a slot used for PUCCH transmission need not be designated as shown in Table 6. A slot usage indication indicating which slot of slot #n and slot #n+1 should be used for UL transmission may be freely configured by the scheduler (e.g. BS).

In Table 6 and FIG. 14, some of PUCCH resource indexes are used in the first slot and the other indexes are used in the second slot. Referring to Table 6, since a CCE index is mapped to a PUCCH resource index one to one, the PUCCH resource index is determined according to a DL grant CCE index. However, if the same PRB is used for PUCCH transmission of a legacy UE and PUCCH transmission of an advanced UE, a PUCCH resource allocated to any one of the legacy UE and the advanced UE cannot allocated to the other one of the legacy UE and the advanced UE in a PRB pair including the same PRB. For example, it is assumed that a CCE index used for PUCCH resource determination is 7 and an ACK/NACK PUCCH resource index calculated from the CCE index is 7 (in this case, an offset value between the CCE index and the PUCCH resource index is 0). Referring to FIG. 14, the advanced UE operating on a slot basis transmits a PUCCH in a previously designated slot using a PUCCH resource, an index of which is 7. At this time, PUCCH resource index 7 is not used in a slot which is not used for PUCCH transmission of the advanced UE out of two slots of one subframe. That is, a BS does not allocate a PUCCH resource allocated to the advanced UE in one subframe to the legacy UE, so that the advanced UE and the legacy UE can be prevented from transmitting their PUCCHs using the same PUCCH resource in the other slot of the two slots. Accordingly, even if a PDCCH for the legacy UE or a PDCCH for the advanced UE is located on any CCE index, a subframe-based PUCCH of the legacy UE and a slot-based PUCCH of the advanced UE can be multiplexed in the same PRB without any problem. In this example, the slot-based PUCCH is transmitted in one of two slots in a subframe corresponding to a PUCCH transmission timing and a PUCCH resource, an index of which is 7 in the other slot, is not used for slot-based PUCCH transmission. Therefore, according to this embodiment, if the advanced UE transmits a PUCCH using a PUCCH resource having a specific PUCCH resource index in one slot of a subframe, a PUCCH resource having the same index in the other slot of the subframe is not used unless allocated to another advanced UE. Notably, according to this embodiment, since a scheduler can freely allocate a PDCCH/PDSCH to the UE, scheduling flexibility can be ensured.

B) Embodiment for Increasing Resource Efficiency by Applying Some Scheduling Restrictions (Restrictions on PDCCH Arrangement)

Figure 15:
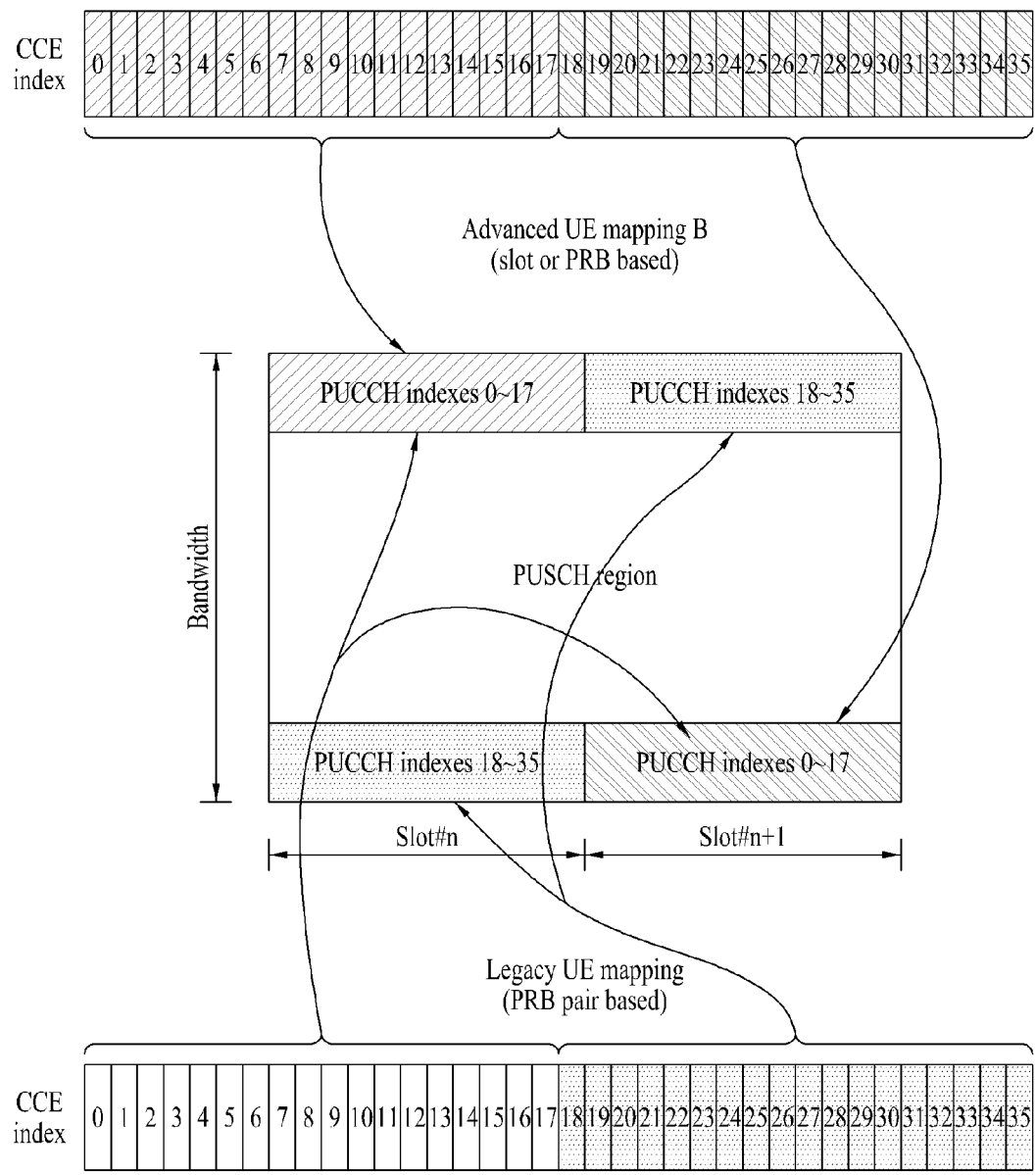
FIG. 15 illustrates another embodiment of the present invention for mapping CCE indexes to PUCCH format 1/1a/1b.

Table 7, Table 8, and FIG. 15 illustrate another embodiment of the present invention for mapping CCE indexes to PUCCH format 1/1a/1b.

TABLE 7

| CCE index | PUCCH resource index (for advanced UEs in the first slot) | PUCCH resource index (for advanced UEs in the second slot) |
| --- | --- | --- |
| 0 | 0 | |
| 1 | 1 | |
| 2 | 2 | |
| 3 | 3 | |
| 4 | 4 | |
| 5 | 5 | |
| 6 | 6 | |
| 7 | 7 | |
| 8 | 8 | |
| 9 | 9 | |
| 10 | 10 | |

TABLE 7-continued

| CCE index | PUCCH resource index (for advanced UEs in the first slot) | PUCCH resource index (for advanced UEs in the second slot) |
|---|---|---|
| 11 | 11 | |
| 12 | 12 | |
| 13 | 13 | |
| 14 | 14 | |
| 15 | 15 | |
| 16 | 16 | |
| 17 | 17 | |
| 18 | | 0 |
| 19 | | 1 |
| 20 | | 2 |
| 21 | | 3 |
| 22 | | 4 |
| 23 | | 5 |
| 24 | | 6 |
| 25 | | 7 |
| 26 | | 8 |
| 27 | | 9 |
| 28 | | 10 |
| 29 | | 11 |
| 30 | | 12 |
| 31 | | 13 |
| 32 | | 14 |
| 33 | | 15 |
| 34 | | 16 |
| 35 | | 17 |

TABLE 8

| CCE index | PUCCH resource index (for legacy UEs in the first slot) | PUCCH resource index (for legacy UEs in the second slot) |
|---|---|---|
| 0 | 0 | 0 |
| 1 | 1 | 1 |
| 2 | 2 | 2 |
| 3 | 3 | 3 |
| 4 | 4 | 4 |
| 5 | 5 | 5 |
| 6 | 6 | 6 |
| 7 | 7 | 7 |
| 8 | 8 | 8 |
| 9 | 9 | 9 |
| 10 | 10 | 10 |
| 11 | 11 | 11 |
| 12 | 12 | 12 |
| 13 | 13 | 13 |
| 14 | 14 | 14 |
| 15 | 15 | 15 |
| 16 | 16 | 16 |
| 17 | 17 | 17 |
| 18 | | |
| 19 | | |
| 20 | | |
| 21 | | |
| 22 | | |
| 23 | | |
| 24 | | |
| 25 | | |
| 26 | | |
| 27 | | |
| 28 | | |
| 29 | | |
| 30 | | |
| 31 | | |
| 32 | | |
| 33 | | |
| 34 | | |
| 35 | | |

Table 7 shows linkage of CCE indexes to PUCCH resource indexes for advanced UEs and FIG. 8 shows linkage of CCE indexes to PUCCH resource indexes for legacy UEs.

CCE indexes linked to the first slot and CCE indexes linked to the second slot may be separately used. For example, assuming that there are 36 CCEs in total and 36 PUCCH resources corresponding thereto, a scheduler may use the first 18 PUCCH resources among the 36 PUCCH resources for the first slot and use the other 18 PUCCH resources for the second slot. Referring to Table 7, if a PUCCH resource index allocated to an advanced UE by implicit signaling is 16 (a value between 0 and 17), this may mean that slot-based PUCCH transmission should be performed using PUCCH resource index 16 in the first slot. On the other hand, if an allocated PUCCH resource index is 25 (a value between 18 and 35), this may mean that slot-based PUCCH transmission should be performed using PUCCH resource index 7 in the second slot. In the case of the legacy UE, the BS may transmit a PUCCH to the legacy UE by mapping the PUCCH to a CCE so as to use only the first 18 PUCCH resources.

CCE indexes 0 to 17 of Table 7 for the advanced UE are linked to PUCCH resources 0 to 17 of the first slot and CCE indexes 18 to 35 of Table 8 for the legacy UE are linked to PUCCH resources 0 to 17 of the first slot and the second slot. When the BS (or scheduler) arranges PDCCHs for the advanced UE and PDCCHs for the legacy UE on CCE indexes 0 to 17, the BS may not allocate PDCCHs for different UEs to the same CCE. In contrast, CCE indexes 18 to 35 of Table 7 for the advanced UE are linked to PUCCH resource indexes 0 to 17 of the second slot and CCE indexes 0 to 17 of Table 8 for the legacy UE are also linked to PUCCH resource indexes 0 to 17. In the second slot, since different CCE indexes are linked to the same PUCCH resource, there is a high probability that the same PUCCH resource is allocated to the advanced UE and the legacy UE. Assuming that the BS always allocates one of CCE indexes 0 to 17 to each legacy UE, for example, if the BS transmits a PDCCH to the legacy UE on a set of one or more CCEs including CCE index 10, it is preferable not to allocate CCE index 28, which is a CCE index of the second slot corresponding to CCE index 10 of the first slot, to other UEs. This is because, if ACK/NACK signals of different UEs are transmitted using the same PUCCH resource in one PRB, it is difficult to separate the ACK/NACK signals transmitted by the respective UEs. In terms of the legacy UE, CCE index 10 of the first slot and CCE index 28 of the second slot mean indexes linked to the same PUCCH resource. In fact, in the case in which indexes 18 to 35 are used for slot-mode transmission of the advanced UE, CCE indexes 18 to 35 may be regarded as CCE indexes for the advanced UE virtually generated by adding 18 to CCE indexes 0 to 17 used in the first slot. Therefore, since PUCCH resource indexes linked to CCE indexes 18 to 35 may overlap with PUCCH resource indexes of the legacy UE in the second slot, it is desirable for the BS to schedule PUCCH resources to be used by the legacy UE and PUCCH resources to be used by the advanced UE so as to avoid collision therebetween.

According to this embodiment, the BS does not allocate the legacy UE to CCEs except for a designated range of CCE indexes (e.g. CCE indexes 0 to 17) and thus resources can be efficiently used.

In addition, this embodiment is advantageous in that a slot usage indication is not needed. Notably, the BS transmits indication information indicating a boundary of CCE indexes used in the first slot and the second slot to the UE unless PUCCH resource indexes used in the first slot and PUCCH resource indexes used in the second slot are predefined. The BS may determine the boundary of CCE indexes in consideration of the numbers and load of legacy UEs and advanced UEs to which services should be provided, a UL channel state, and the like and transmit information indicating the determined boundary to the UE. In this case, the BS has an advantage capable of distinguishing between CCE indexes for the legacy UE and CCE indexes for the advanced UE, in consideration of UL load of a corresponding cell, distribution of legacy UEs and advanced UEs, and a UL channel state. If the UL channel state of a corresponding cell is poor or there is no advanced UE in the corresponding cell, the BS may configure all CCE indexes as indexes for the legacy UEs. In contrast, all UEs located in a corresponding cell are advanced UEs and a UL channel state thereof is good, the BS may configure all CCE indexes as indexes for the advanced UEs.

C) Embodiment for Dividing PUCCH Resource Indexes Used in the First Slot and PUCCH Resource Indexes Used in the Second Slot into Even-Numbered Indexes and Odd-Numbered Indexes, for More Efficient Resource Allocation Using Distribution Characteristics of a CCE Aggregation Level.

Figure 16:
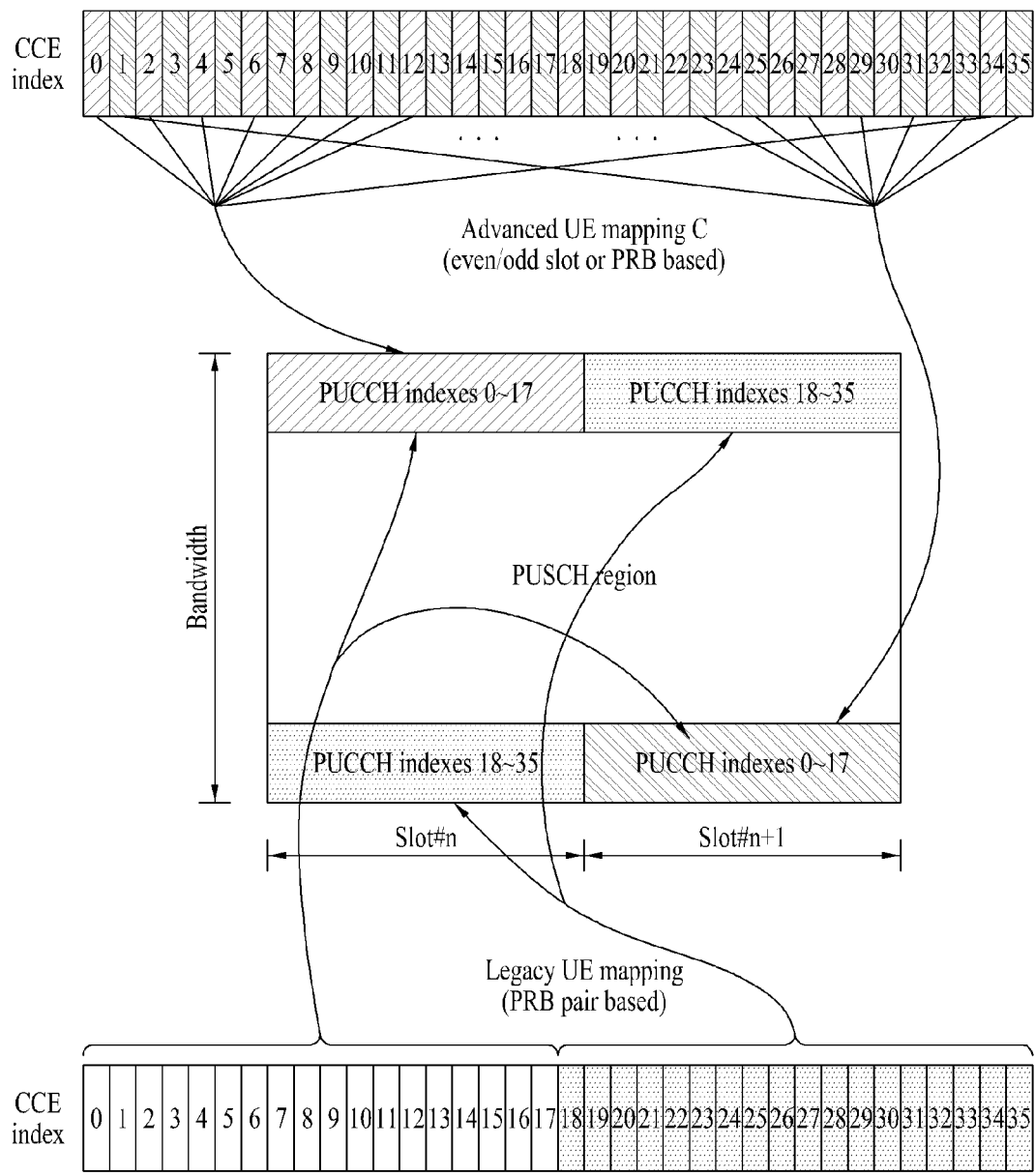
FIG. 16 illustrates still another embodiment of the present invention for mapping CCE indexes to PUCCH format 1/1a/1b.

Table 9, Table 10, and FIG. 16 illustrate still another embodiment of the present invention for mapping CCE indexes to PUCCH format 1/1a/1b.

TABLE 9

| CCE index | PUCCH resource index (for advanced UEs the first slot) | PUCCH resource index (for advanced UEs in the second slot) |
|---|---|---|
| 0 | 0 | |
| 1 | | 1 |
| 2 | 2 | |
| 3 | | 3 |
| 4 | 4 | |
| 5 | | 5 |
| 6 | 6 | |
| 7 | | 7 |
| 8 | 8 | |
| 9 | | 9 |
| 10 | 10 | |
| 11 | | 11 |
| 12 | 12 | |
| 13 | | 13 |
| 14 | 14 | |
| 15 | | 15 |
| 16 | 16 | |
| 17 | | 17 |
| 18 | 18 | |
| 19 | | 19 |
| 20 | 20 | |
| 21 | | 21 |
| 22 | 22 | |
| 23 | | 23 |
| 24 | 24 | |
| 25 | | 25 |
| 26 | 26 | |
| 27 | | 27 |
| 28 | 28 | |
| 29 | | 29 |
| 30 | 30 | |
| 31 | | 31 |
| 32 | 32 | |
| 33 | | 33 |
| 34 | 34 | |
| 35 | | 35 |

TABLE 10

| CCE index | PUCCH resource index (for legacy UEs in the first slot) | | PUCCH resource index (for legacy UEs in the second slot) | |
|---|---|---|---|---|
| | First priority allocation | Second priority allocation | First priority allocation | Second priority allocation |
| 0 | 0 | | 0 | |
| 1 | | 1 | | 1 |
| 2 | 2 | | 2 | |
| 3 | | 3 | | 3 |
| 4 | 4 | | 4 | |
| 5 | | 5 | | 5 |
| 6 | 6 | | 6 | |
| 7 | | 7 | | 7 |
| 8 | 8 | | 8 | |
| 9 | | 9 | | 9 |
| 10 | 10 | | 10 | |
| 11 | | 11 | | 11 |
| 12 | 12 | | 12 | |
| 13 | | 13 | | 13 |
| 14 | 14 | | 14 | |
| 15 | | 15 | | 15 |
| 16 | 16 | | 16 | |
| 17 | | 17 | | 17 |
| 18 | 18 | | 18 | |
| 19 | | 19 | | 19 |
| 20 | 20 | | 20 | |
| 21 | | 21 | | 21 |
| 22 | 22 | | 22 | |
| 23 | | 23 | | 23 |
| 24 | 24 | | 24 | |
| 25 | | 25 | | 25 |
| 26 | 26 | | 26 | |
| 27 | | 27 | | 27 |
| 28 | 28 | | 28 | |
| 29 | | 29 | | 29 |
| 30 | 30 | | 30 | |
| 31 | | 31 | | 31 |
| 32 | 32 | | 32 | |
| 33 | | 33 | | 33 |
| 34 | 34 | | 34 | |
| 35 | | 35 | | 35 |

Table 9 shows linkage of CCE indexes to PUCCH resource indexes for advanced UEs and Table 10 shows linkage of CCE indexes to PUCCH resource indexes for legacy UEs.

If there is a CCE aggregation level mainly used for PDCCH transmission, for example, if most CCE aggregation levels are 2, a PUCCH resource corresponding to the second CCE index out of two aggregated CCEs will not frequently be used. In this case, CCE indexes used in the first slot and CCE indexes used in the second slot may be dividedly employed based on a mainly used CCE aggregation level. Referring to Table 9 under the assumption that the mainly used CCE aggregation level is 2, for example, PUCCH resources associated with even-numbered CCE indexes among CCE indexes may be used for the advanced UE in the first slot, whereas PUCCH resources associated with odd-numbered CCE indexes may be used for the advanced UE in the second slot.

If odd-numbered PUCCH resources among even-numbered PUCCH resources and odd-numbered PUCCH resources are allocated to the legacy UE, since PUCCH resources of the advanced UE and PUCCH resources of the legacy UE may be mixed in a PBB of the second slot, it is difficult to easily manage the PUCCH resources. Accordingly, referring to Table 10, the BS may allocate with priority even-numbered PUCCH resources among the even-numbered PUCCH resources and the odd-numbered PUCCH resources to the legacy UE.

For reference, in the case of a large CCE aggregation level, since the large CCE aggregation level is another expression of a bad DL channel state, there is a high probability that a UL channel state is bad. In TDD in which UL transmission and DL transmission are distinguished according to time and both UL transmission and DL transmission are performed in the same frequency band, since a UL channel and a DL channel have similar frequency characteristics, the DL channel state is likely to be bad if the UL channel state is not good. In consideration of this viewpoint, in this embodiment, upon receiving a PDCCH at a large CCE aggregation level (e.g. 4 or 8), the advanced UE may be configured to perform PRB-based PUCCH transmission (PUCCH transmission on a PRB pair basis), i.e. subframe-mode PUCCH transmission, instead of slot-mode PUCCH transmission. Since the BS determines a CCE aggregation level and transmits a PDCCH at the determined CCE aggregation level, the UE is able to know whether slot-mode PUCCH transmission is to be performed or subframe-mode PUCCH transmission is to be performed.

In the afore-described embodiment B, if a PDCCH of the legacy UE is located on CCE index 0, since PUCCH resource index 0 is used in both of two PRBs of a PUCCH PRB pair, the BS is restricted in that a CCE index linked to PUCCH resource index 0 in the second slot (e.g. CCE index 17 in Table 7) should not be allocated to the advanced UE. In this embodiment, since mapping between a CCE index and a PUCCH resource index is configured such that a PUCCH resource index used in the first slot may not be used at all in the second slot, a CCE index allocated to the legacy UE has no effect on PUCCH transmission caused by another UE in the second slot only if a PDCCH of the legacy UE and a PDCCH of the advanced UE are arranged on different CCE indexes.

Notably, this embodiment and embodiment B are similar in that CCE indexes used in the first slot are distinguished from CCE indexes used in the second slot. Even if additional slot usage indication information is not received, upon detecting a CCE index belonging to a set of CCE indexes for the first slot, a UE configured according to this embodiment or embodiment B transmits PUCCHs in the first slot and, upon detecting a CCE index belonging to CCE indexes for the second slot, the UE transmits PUCCHs in the second slot. Since both the UE and BS know which CCE index is used for which slot, the BS may know in which slot and using which PUCCH resource the UE is to transmit a corresponding PUCCH. Therefore, the BS can effectively detect (or receive) PUCCHs transmitted by the UE.

D) Embodiment Using a PUCCH Resource Configured by RRC

If a new PDCCH (e.g. an R-PDCCH or E-PDCCH), rather than a legacy PDCCH transmitted in a PDCCH region, is introduced, an additional ACK/NACK PUCCH resource for the new PDCCH should be secured.

Figure 17:
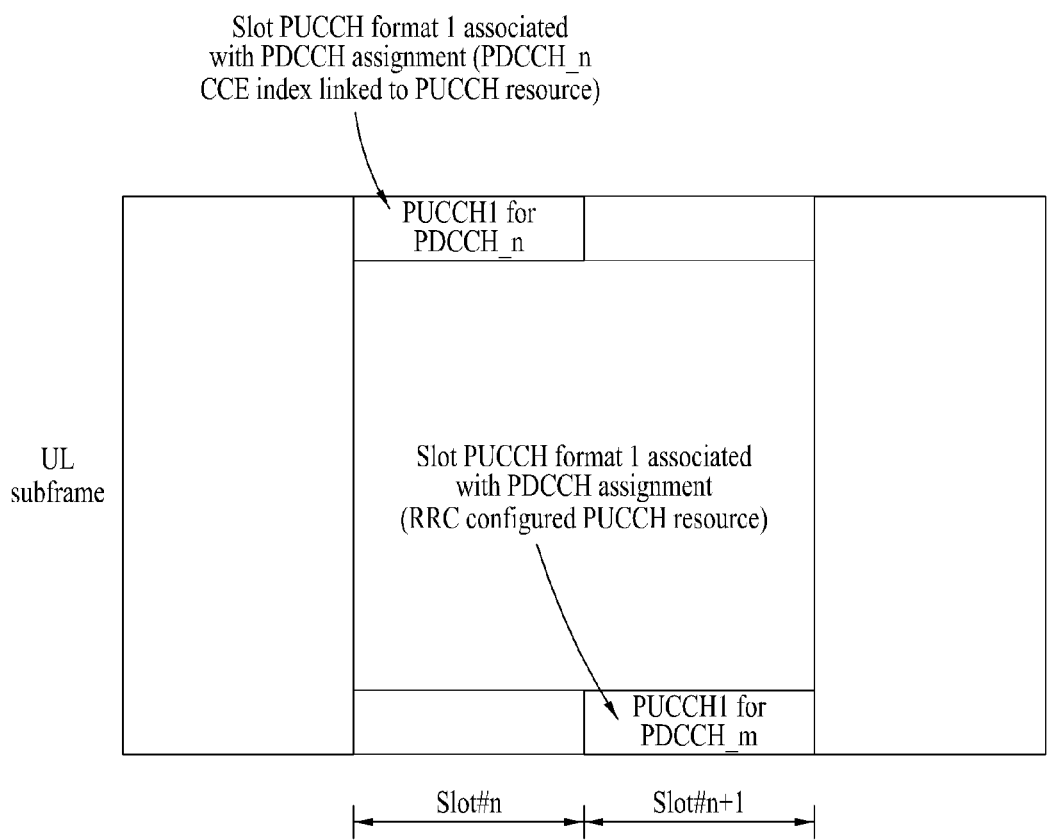
FIGS. 17 and 18 illustrate another embodiment of the present invention for mapping CCE indexes to PUCCH format 1/1a/1b.
Figure 18:
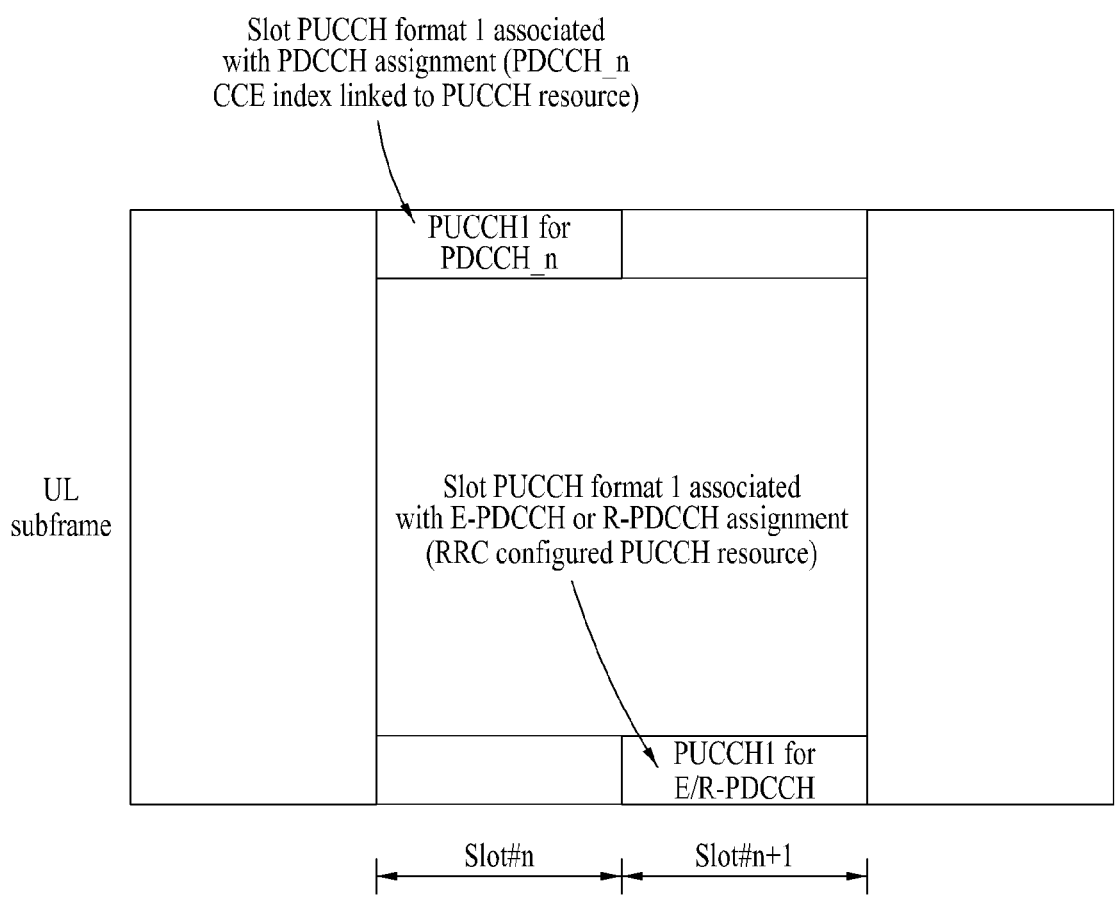

Table 11, FIG. 17, and FIG. 18 illustrate another embodiment for mapping CCE indexes to PUCCH format 1/1a/1b.

TABLE 11

| CCE Index | ACK/NACK resource index (for the first slot) | ACK/NACK resource index (for the second slot) |
|---|---|---|
| 0 | 0 | N + 0 |
| 1 | 1 | N + 1 |
| 2 | 2 | N + 2 |
| 3 | 3 | N + 3 |
| 4 | 4 | N + 4 |
| ... | ... | |
| N − 1 | N − 1 | 2N − 1 |

N: offset value by RRC signal

Referring to Table 11, for example, a PUCCH resource applying an offset value N to a CCE index may be used for slot-based PUCCH transmission. In this case, the first slot may be used for PUCCH transmission associated with a PDCCH and the second slot may be used for PUCCH transmission associated with a newly designed PDCCH (e.g. an R-PDCCH or E-PDCCH). In contrast, the first slot may be used for the newly designed PDCCH and the second slot may be used for PUCCH transmission associated with a legacy PDCCH. Alternatively, separately from Table 11, a resource (PUCCH1 resource of FIG. 18) for independent PUCCH format 1/1a/1b may be allocated to individual UEs.

In the above-described embodiments A to D, while a mapping relationship has been described such that CCE indexes sequentially correspond to PUCCH resource indexes in an ascending order, this is purely for convenience of description and it is apparent that the CCE indexes are not necessarily sequentially mapped to the PUCCH resource indexes.

PUCCH Format 2 Series

Figure 19:
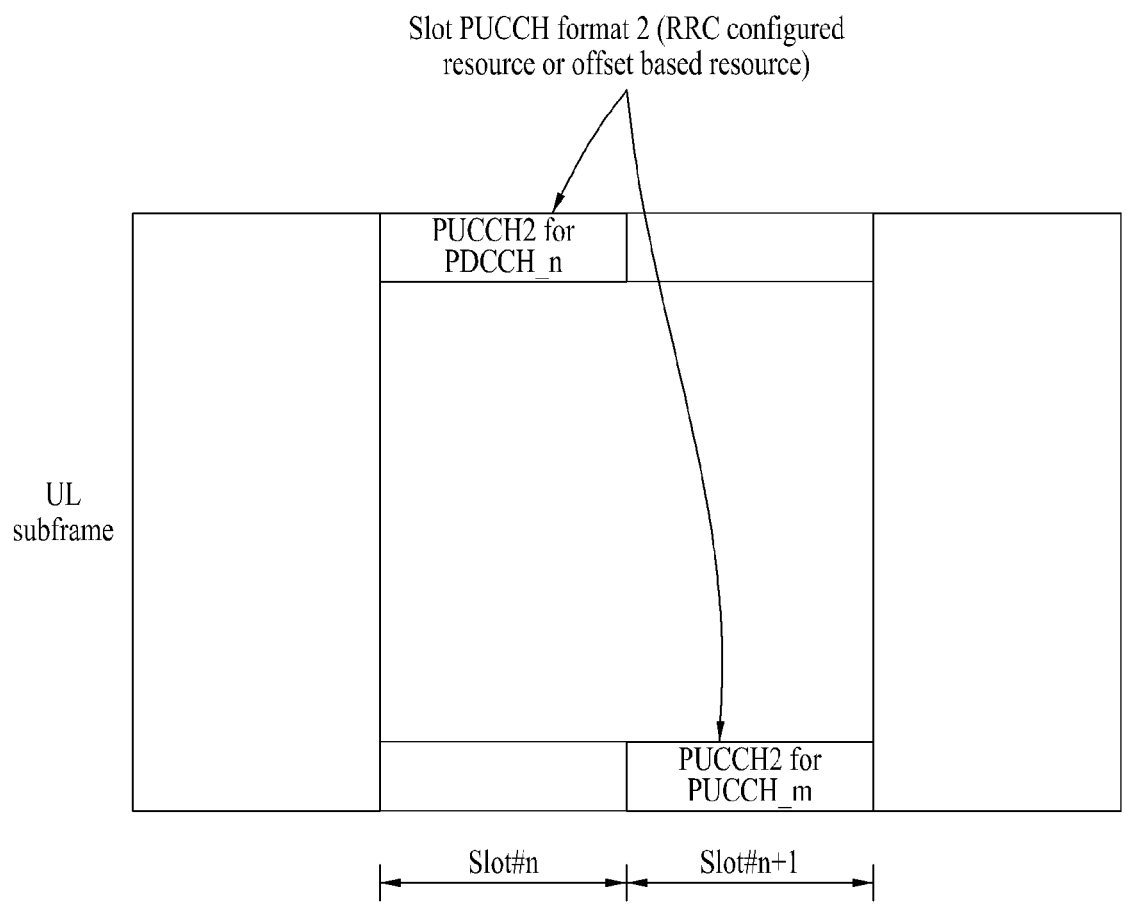
FIG. 19 illustrates an embodiment of the present invention regarding PUCCH resources for PUCCH format 2/2a/2b.

FIG. 19 illustrates an embodiment of the present invention regarding PUCCH resources for PUCCH format 2/2a/2b.

PUCCH format 2 series is used for CSI transmission and one CSI transmission is divided into two transmissions which are respectively mapped to two slots. That is, since one CSI transmission is divided into two parts to be transmitted to the BS in two PRBs, the BS cannot restore CSI only using information transmitted in one slot. Therefore there is difficulty in CSI transmission on a slot basis. Obviously, as a simple method, one of the two slots may be naturally punctured to transmit a CSI PUCCH. However, a more desirable method is defining new CSI coding suitable for the number of slot-based symbols. That is, a current subframe-based Reed-Muller (RM) coding may desirably be changed to slot-based RM coding to apply independent coding in each slot. In this case, since this method may entail restrictions of reducing the number of CSI transmission bits capable of being transmitted on one PUCCH compared with a legacy system, a CSI transmission scheme also needs to be corrected. For example, a method may be considered in which CSI is dividedly transmitted in a corresponding slot over several subframes. A resource of PUCCH format 2 for a slot mode may be reserved using higher-layer signaling (e.g. RRC signaling). If resource reservation according to legacy 3GPP LTE(-A) is applied in the first slot without change, a CSI PUCCH resource should be newly reserved in the second slot. Alternatively, as described earlier, a CSI PUCCH resource in the second slot may be determined by applying a designated offset value to a CSI PUCCH resource reserved in the first slot. Alternatively, independent resource reservation may be performed per slot by RRC signaling.

PUCCH Format 3 Series

Figure 20:
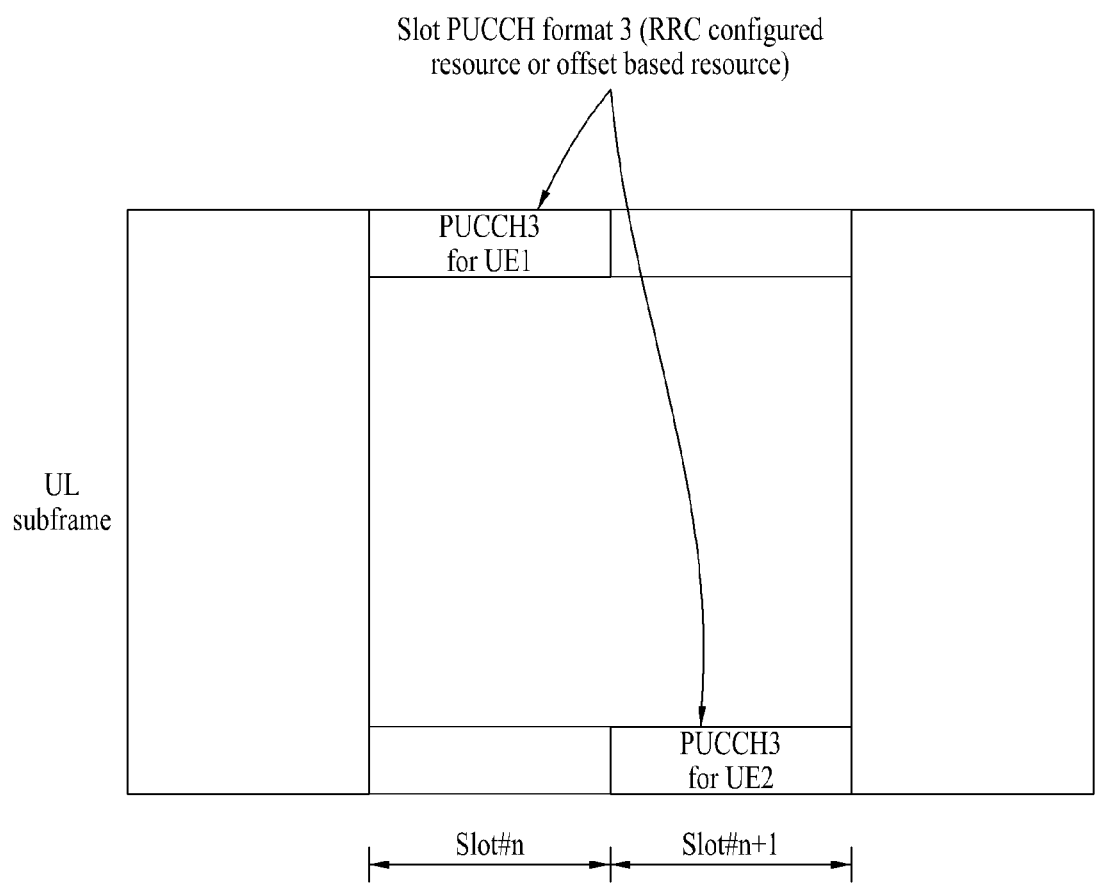
FIG. 20 illustrates an embodiment of the present invention regarding PUCCH resources for PUCCH format 3.

FIG. 20 illustrates an embodiment of the present invention regarding PUCCH resources for PUCCH format 3.

A resource of PUCCH format 3 is pre-reserved by higher-layer signaling. The reserved PUCCH resource is designed under the assumption that the resource is applied over several subframes unlike PUCCH format 1 in which the resource is changed on a subframe basis. The BS previously informs UE of a predetermined number of PUCCH resources (e.g. a total of four PUCCH resources) (one set) and informs the UE which PUCCH resource of the PUCCH resources is to be selected through an ACK/NACK resource indication (ARI). The ARI is transmitted to the UE on a PDCCH. The PUCCH resource indicated by the ARI is a value valid in one subframe.

As a basic method for designing slot-based PUCCH format 3, a PUCCH is configured to divide a subframe in half based on a slot so that 12 QPSK symbols are transmitted in the first slot and 12 QPSK symbols are transmitted in the second slot, thereby designing slot-based PUCCH format 3. This is referred to as slotted PUCCH format 3 (hereinafter, S-PUCCH3). According to S-PUCCH3, ACK/NACK based on PUCCH format 3 in each slot is limited to transmission only up to 24 bits at one PUCCH transmission timing. One method for securing a PUCCH format 3 resource needed in each slot is to signal information about a slot in which the PUCCH format 3 resource is to be used to the UE together with or independently of a pre-designated PUCCH resource set and to indicate one PUCCH resource by the BS to the UE using the ARI. For example, the BS may inform the UE whether PUCCH format 3 should be transmitted only in the first slot or the second slot or in the two slots and inform the UE of one of PUCCH resources belonging to the pre-designated PUCCH resource set through the ARI. Each UE may transmit S-PUCCH3 in the first slot and/or the second slot. The UE may transmit S-PUCCH3 using one PUCCH resource designated by the ARI among a predetermined number of PUCCH resources allocated thereto. According to this embodiment, even when the same PUCCH format 3 resource is allocated to different UEs due to characteristics of slot-mode transmission, no problems arise if the different UEs transmit PUCCHs in different slots.

FIG. 20 illustrates the case in which a PUCCH resource set for PUCCH format 3 is indicated by higher-layer signaling and an accurate PUCCH resource is indicated through a PDCCH. Unlike this case, one integrated signaling associated with the aforementioned slot usage indication may be simultaneously used for slot assignment and resource assignment.

In the above-described embodiments of the present invention regarding PUCCH resource reservation, slot-based RB hopping may not be applied to PUCCH transmission, for convenience of resource management.

For reference, as described above, a PUCCH resource index indicates a PUCCH resource expressed by a combination of a CS and an OC. In fact, the PUCCH resource index may vary with a sequence hopping pattern in each OFDM symbol or each slot. However, for convenience, the description will be given without considering hopping. If hopping is considered, PUCCH resource index k corresponds to PUCCH resource index k applied to the first OFDM symbol of a corresponding subframe or the first OFDM symbol of a corresponding slot.

<Precoding Vector Indication>

In an embodiment of the present invention, UEs capable of performing MIMO transmission in UL can improve slot-based PUCCH transmission performance by applying appropriate precoding to a corresponding PUCCH. While a PUCCH is transmitted in two slots of one subframe in a legacy system, a PUCCH transmitted according to the embodiments of the present invention is transmitted in only one of the two slots of one subframe. Accordingly, radio resources used for PUCCH transmission are cut in half and frequency diversity gain is reduced relative to subframe-based transmission. If a UE includes a plurality of antenna ports, such performance loss can be compensated for through precoding. Especially, in the case of low-mobility UEs that hardly move, diversity gain obtained by a transmission scheme operating in a closed-loop form may be more favorable than diversity gain obtained by a transmission scheme operating in an open-loop form.

Precoding applied to a PUCCH is not arbitrarily determined by the UE and is indicated by the BS to the UE. In this case, the BS indicates a precoding matrix to be applied in the long term instead of indicating a proper precoding matrix in each subframe of a normal PDSCH. Such a long-term based precoding matrix may be transmitted to the UE by an RRC configuration signal or by a specialized PDCCH (hereinafter, S-PDCCH). The S-PDCCH has a characteristic of carrying precoding information capable of being used by one or multiple UEs. For example, if four UEs should update precoding applied to PUCCHs, the BS may transmit only one S-PDCCH. The four UEs related to the S-PDCCH carrying the updated precoding information may decode the same S-PDCCH and obtain precoding information to which PDCCHs thereof should be applied from the S-PDCCH. In order for a plurality of UEs to share the S-PDCCH, the S-PDCCH may be assigned a common identity for a specific UE group, i.e. an RNTI. The specific UE group may detect an S-PDCCH associated therewith using an RNTI used for the S-PDCCH.

Figure 21:
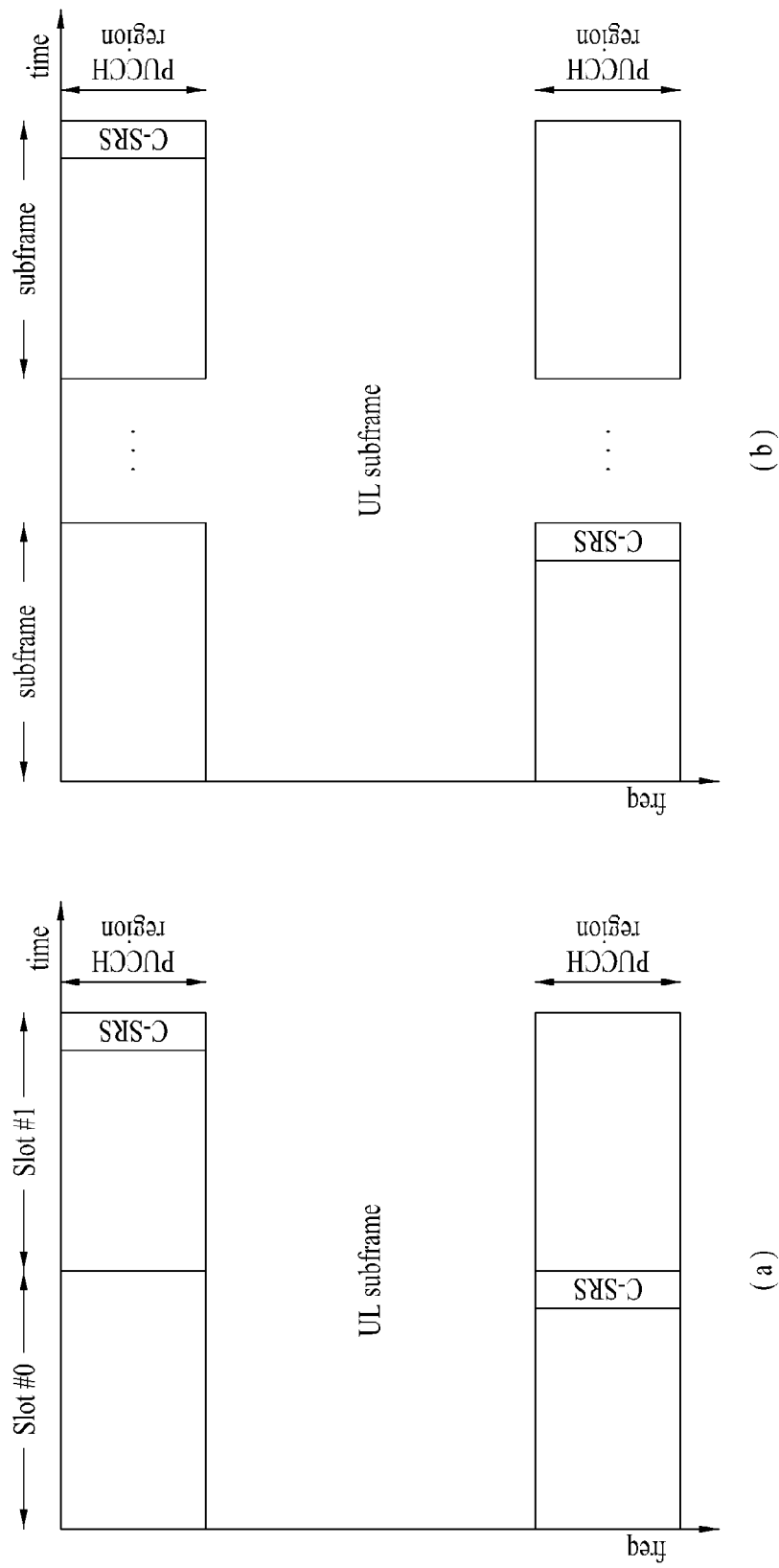
FIG. 21 illustrates embodiments of the present invention for transmitting a reference signal for channel estimation of a UL control region.

FIG. 21 illustrates embodiments of the present invention for transmitting an RS for channel estimation of a UL control region.

In order for the BS to estimate proper precoding for a PUCCH, a mechanism in which the BS can infer CSI about a time-frequency resource region for PUCCH transmission is needed. An SRS transmitted from the UE for UL channel state measurement by the BS may aid in performing CSI estimation for MIMO by the BS. However, the SRS may not be transmitted in a control region of a UL subframe in which a PUCCH is transmitted (according to a configuration state of the SRS). In this case, the SRS has a high probability of not sufficiently performing a role as an RS for CSI estimation for a PUCCH. To overcome such a problem, the present invention proposes an embodiment for additionally defining a control-SRS (hereinafter, a C-SRS) and transmitting the C-SRS in a PUCCH region.

Referring to FIG. 21, unlike a normal SRS, the C-SRS is not transmitted in a broad band and is transmitted only in a PUCCH region, a PUCCH transmission RB, or a region corresponding to a pre-designated RB. The C-SRS may be transmitted in a PUCCH region per slot in one subframe as illustrated in FIG. 21(a). Alternatively, as illustrated in FIG. 21(b), the C-SRS may be transmitted in one PUCCH region of two PUCCH regions located respectively at both ends of bandwidth of a corresponding carrier based on a DC subcarrier in one subframe in the frequency domain and may be transmitted in an opposite PUCCH region in the next transmission opportunity. When slot-based PUSCH/PUCCH transmission is considered, it is desirable to transmit the C-SRS in each slot as in the embodiment of FIG. 21(a). Notably, since a low-mobility UE has a low time-varying channel state, the C-SRS may not be transmitted in each slot as illustrated in the embodiment of FIG. 21(b) in order to lower an increase of UL RS overhead. The UE may transmit the C-SRS in a PUCCH region of a subframe corresponding to a transmission cycle of the C-SRS configured from the BS or transmit the C-SRS in a PDSCH region of a subframe at the request of the BS.

<Fallback Operation>

If a signal transmitted/received according to any one of the above-described embodiments does not satisfy system requirements and problems arise in a system, it is preferable that BS perform a fallback operation returning to a legacy normal mode from a slot mode. That is, in a situation in which a channel state is poor so that slot-based UL transmission cannot be maintained any longer or in an RRC reconfigured situation, the BS reconfigures the UE such that a slot mode may fall back to a legacy subframe-based UL transmission mode, i.e. a subframe mode.

The UE of the present invention may be configured to perform UL transmission by independently applying any one of the embodiments of the present invention described in <slot usage indication>, <UE grouping>, <subframe bundling>, <PUCCH resource reservation>, <precoding vector indication> and <fallback operation> or applying one or more of the embodiments together. The BS of the present invention may be configured to receive UL transmission by independently applying any one of the embodiments of the present invention described in <slot usage indication>, <UE grouping>, <subframe bundling>, <PUCCH resource reservation>, <precoding vector indication> and <fallback operation> or applying one or more of the embodiments together.

Figure 22:
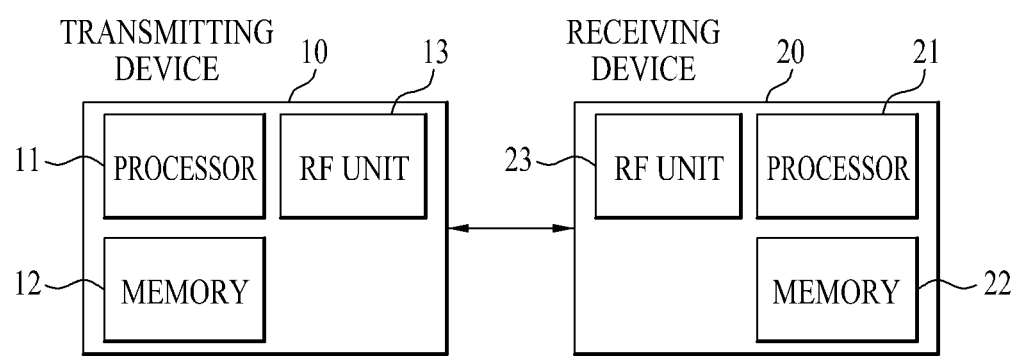
FIG. 22 is a block diagram illustrating elements of a transmitting device 10 and a receiving device 20 for implementing the present invention.

FIG. 22 is a block diagram illustrating elements of a transmitting device 10 and a receiving device 20 for implementing the present invention.

The transmitting device 10 and the receiving device 20 respectively include Radio Frequency (RF) units 13 and 23 capable of transmitting and receiving radio signals carrying information, data, signals, and/or messages, memories 12 and 22 for storing information related to communication in a wireless communication system, and processors 11 and 21 operationally connected to elements such as the RF units 13 and 23 and the memories 12 and 22 to control the elements and configured to control the memories 12 and 22 and/or the RF units 13 and 23 so that a corresponding device may perform at least one of the above-described embodiments of the present invention.

The memories 12 and 22 may store programs for processing and controlling the processors 11 and 21 and may temporarily store input/output information. The memories 12 and 22 may be used as buffers.

The processors 11 and 21 generally control the overall operation of various modules in the transmitting device and the receiving device. Especially, the processors 11 and 21 may perform various control functions to implement the present invention. The processors 11 and 21 may be referred to as controllers, microcontrollers, microprocessors, or microcomputers. The processors 11 and 21 may be implemented by hardware, firmware, software, or a combination thereof. In a hardware configuration, application specific integrated circuits (ASICs), digital signal processors (DSPs), digital signal processing devices (DSPDs), programmable logic devices (PLDs), or field programmable gate arrays (FPGAs) may be included in the processors 11 and 21. Meanwhile, if the present invention is implemented using firmware or software, the firmware or software may be configured to include modules, procedures, functions, etc. performing the functions or operations of the present invention. Firmware or software configured to perform the present invention may be included in the processors 11 and 21 or stored in the memories 12 and 22 so as to be driven by the processors 11 and 21.

The processor 11 of the transmitting device 10 performs predetermined coding and modulation for a signal and/or data scheduled to be transmitted to the outside by the processor 11 or a scheduler connected with the processor 11, and then transfers the coded and modulated data to the RF unit 13. For example, the processor 11 converts a data stream to be transmitted into K layers through demultiplexing, channel coding, scrambling, and modulation. The coded data stream is also referred to as a codeword and is equivalent to a transport block which is a data block provided by a MAC layer. One transport block (TB) is coded into one codeword and each codeword is transmitted to the receiving device in the form of one or more layers. For frequency up-conversion, the RF unit 13 may include an oscillator. The RF unit 13 may include $N_t$ (where $N_t$ is a positive integer) transmit antennas.

A signal processing process of the receiving device 20 is the reverse of the signal processing process of the transmitting device 10. Under control of the processor 21, the RF unit 23 of the receiving device 20 receives radio signals transmitted by the transmitting device 10. The RF unit 23 may include $N_r$ (where $N_r$ is a positive integer) receive antennas and frequency down-converts each signal received through receive antennas into a baseband signal. The processor 21 decodes and demodulates the radio signals received through the receive antennas and restores data that the transmitting device 10 intended to transmit.

The RF units 13 and 23 include one or more antennas. An antenna performs a function for transmitting signals processed by the RF units 13 and 23 to the exterior or receiving radio signals from the exterior to transfer the radio signals to the RF units 13 and 23. The antenna may also be called an antenna port. Each antenna may correspond to one physical antenna or may be configured by a combination of more than one physical antenna element. The signal transmitted from each antenna cannot be further deconstructed by the receiving device 20. An RS transmitted in correspondence to a corresponding antenna defines an antenna viewed from the receiving device 20 and enables the receiving device 20 to perform channel estimation for the antenna, irrespective of whether it is a single radio channel from one physical antenna or a composite channel from a plurality of physical antenna elements including the antenna. In other words, the antenna is defined such that a channel carrying a symbol of the antenna may be obtained from a channel carrying another symbol of the same antenna. An RF unit supporting a MIMO function of transmitting and receiving data using a plurality of antennas may be connected to two or more antennas.

In the embodiments of the present invention, a UE or RN operates as the transmitting device 10 in uplink and as the receiving device 20 in downlink. In the embodiments of the present invention, a BS operates as the receiving device 20 in uplink and as the transmitting device 10 in downlink.

The processor of the BS (hereinafter, BS processor) may configure a slot mode according to at least one of the above-described embodiments of the present invention and control the RF unit of the BS (hereinafter, BS RF unit) to signal the configured slot mode to the UE. In addition, the BS processor may control the BS RF unit to transmit information indicating that the UE should operate in a subframe bundling mode to the UE. Moreover, the BS processor may control the BS RF unit to transmit slot usage indication information indicating a slot to be used for UL transmission out of the first slot and second slot of a subframe to a slot-mode configured UE. Although the slot usage indication information is absent, if a slot to be used for UL transmission is implicitly specified, explicit slot usage indication information may not be transmitted to the UE. The BS processor may allocate a PDCCH to one or more CCEs according to any one of the embodiments for <PUCCH resource reservation> and control the BS RF unit to transmit the PDCCH to the UE on a set of the one or more CCEs.

The RF unit of the UE (hereinafter, UE RF unit) may receive slot-mode configuration information indicating configuration of a slot mode from the BS and the processor of the UE (hereinafter, UE processor) may control the UE RF unit and the memory to operate in the slot mode based on the slot-mode configuration information. If the UE RF unit receives a subframe bundling command and the UE is configured to operate in the slot mode, the UE processor may control the UE RF unit to transmit a PUSCH, a PUCCH, and/or an SRS in a predetermined number of consecutive slots by enabling slot bundling instead of subframe bundling. The UE RF unit may receive the slot usage indication information from the BS and the UE processor may control the UE RF unit to transmit the PUSCH, the PUCCH, and/or the SRS in one of two slots of a subframe based on the slot usage indication information. The UE processor may determine a PUCCH resource according to any one of the embodiments for <PUCCH resource reservation> based on the first CCE included in the PDCCH and control the UE RF unit to transmit the PUCCH in one slot using the determined PUCCH resource.

According to the above-described embodiments of the present invention, unlike a conventional scheme in which K PUCCHs should be transmitted in N PRB pairs, K PUCCHs can be transmitted in N/2 PRB pairs, thereby raising efficiency of resource utilization. Alternatively, UE(s) may transmit a UL signal on a slot basis while maintaining efficiency of resource utilization in the conventional scheme (i.e. using N PRB pairs), thereby reducing the number of PUCCHs multiplexed in a predetermined number of PRBs (e.g. one PRB). If the number of PUCCHs multiplexed in a predetermined number of PRBs is reduced, interference between orthogonal sequences used to multiplex the PUCCHs in a predetermined number of PRBs can be cut in half.

INDUSTRIAL APPLICABILITY

The embodiments of the present invention are applicable to a BS, a relay, a UE, or other devices in a wireless communication system.

The invention claimed is:

1. A method for transmitting uplink control information by a user equipment in a wireless communication system, comprising:
receiving, by the user equipment, a physical downlink control channel (PDCCH); and
transmitting, by the user equipment, a physical uplink control channel (PUCCH) carrying acknowledgement/negative acknowledgement (ACK/NACK) information corresponding to the PDCCH,
wherein the PUCCH is transmitted within a first slot of a subframe other than a second slot of the subframe when an index of a first control channel element (CCE) included in the PDCCH belongs to a first CCE set and the PUCCH is transmitted within the second slot of the subframe other than the first slot of the subframe when the index of the first CCE belongs to a second CCE set.

2. The method according to claim 1, wherein one of the first CCE set and the second CCE set includes CCE indexes 0 to M−1, where M is a positive integer, among a total of N CCE indexes, where N is an integer greater than 2, and the other one includes CCE indexes M to N−1 among the N CCE indexes.

3. The method according to claim 2, further comprising:
receiving, by the user equipment, information indicating M.

4. The method according to claim 1, wherein one of the first CCE set and the second CCE set includes only even-numbered indexes among a total of N CCE indexes, where N is an integer greater than 2, and the other one includes only odd-numbered indexes among the N CCE indexes.

5. A user equipment for transmitting uplink control information in a wireless communication system, comprising:
a radio frequency (RF) unit configured to transmit or receive a radio signal; and
a processor configured to control the RF unit to receive a physical downlink control channel (PDCCH) and control the RF unit to transmit a physical uplink control channel (PUCCH) carrying acknowledgement/negative acknowledgement (ACK/NACK) information corresponding to the PDCCH,
wherein the processor is configured to control the RF unit to transmit the PUCCH within a first slot of a subframe, other than a second slot of the subframe when an index of a first control channel element (CCE) included in the PDCCH belongs to a first CCE set and the processor is configured to control the RF unit to transmit the PUCCH in the second slot of the subframe other than the first slot of the subframe when the index of the first CCE belongs to a second CCE set.

6. The user equipment according to claim 5, wherein one of the first CCE set and the second CCE set includes CCE indexes 0 to M−1, where M is a positive integer, among a total of N CCE indexes, where N is an integer greater than 2, and the other one includes CCE indexes M to N−1 among the N CCE indexes.

7. The user equipment according to claim 6, wherein the processor is configured to control the RF unit to receive information indicating M.

8. The user equipment according to claim 5, wherein one of the first CCE set and the second CCE set includes only even-numbered indexes among a total of N CCE indexes, where N is an integer greater than 2, and the other one includes only odd-numbered indexes among the N CCE indexes.

9. A method for receiving uplink control information by a base station in a wireless communication system, comprising:
transmitting, by the base station, a physical downlink control channel (PDCCH) to a user equipment; and
receiving, by the base station, a physical uplink control channel (PUCCH) carrying acknowledgement/negative acknowledgement (ACK/NACK) information corresponding to the PDCCH from the user equipment,
wherein the PUCCH is received within a first slot of a subframe, other than a second slot of the subframe when an index of a first control channel element (CCE) included in the PDCCH belongs to a first CCE set and the PUCCH is received within the second slot of the subframe other than the first slot of the subframe when the index of the first CCE belongs to a second CCE set.

10. A base station for receiving uplink control information in a wireless communication system, comprising:
a radio frequency (RF) unit configured to transmit or receive a radio signal; and
a processor configured to control the RF unit to transmit a physical downlink control channel (PDCCH) to a user equipment and control the RF unit to receive a physical uplink control channel (PUCCH) carrying acknowledgement/negative acknowledgement (ACK/NACK) information corresponding to the PDCCH from the user equipment,
wherein the processor is configured to control the RF unit to receive the PUCCH within a first slot of a subframe, other than a second slot of the subframe when an index of a first control channel element (CCE) included in the PDCCH belongs to a first CCE set and the processor is configured to control the RF unit to receive the PUCCH within the second slot of the subframe other than the first slot of the subframe when the index of the first CCE belongs to a second CCE set.

11. The method according to claim 1, further comprising:
receiving, by the user equipment, information indicating that the user equipment is to perform slot-based transmission.

12. The user equipment according to claim 5, wherein the RF unit is configured to receive information indicating that the user equipment is to perform slot-based transmission, and the processor is configured to control the RF unit to transmit the PUCCH either within the first slot of the subframe or within the second slot of the subframe.

13. The method according to claim 9, wherein one of the first CCE set and the second CCE set includes CCE indexes 0 to M−1, where M is a positive integer, among a total of N CCE indexes, where N is an integer greater than 2, and the other one includes CCE indexes M to N−1 among the N CCE indexes.

14. The method according to claim 13, further comprising: transmitting, by the base station, information indicating M.

15. The method according to claim 9, wherein one of the first CCE set and the second CCE set includes only even-numbered indexes among a total of N CCE indexes, where N is an integer greater than 2, and the other one includes only odd-numbered indexes among the N CCE indexes.

16. The method according to claim 9, further comprising: transmitting, by the base station, information indicating that the user equipment is to perform slot-based transmission.

17. The base station according to claim 10, wherein one of the first CCE set and the second CCE set includes CCE indexes 0 to M−1, where M is a positive integer, among a total of N CCE indexes, where N is an integer greater than 2, and the other one includes CCE indexes M to N−1 among the N CCE indexes.

18. The base station according to claim 17, wherein the processor is configured to control the RF unit to transmit information indicating M.

19. The base station according to claim 10, wherein one of the first CCE set and the second CCE set includes only even-numbered indexes among a total of N CCE indexes, where N is an integer greater than 2, and the other one includes only odd-numbered indexes among the N CCE indexes.

20. The base station according to claim 10, wherein the RF unit is configured to transmit information indicating that the user equipment is to perform slot-based transmission, and the processor is configured to control the RF unit to receive the PUCCH either within the first slot of the subframe or within the second slot of the subframe.

* * * * *